(12) United States Patent
Song et al.

(10) Patent No.: US 12,124,879 B2
(45) Date of Patent: Oct. 22, 2024

(54) DEEP NEURAL NETWORK ACCELERATOR FOR OPTIMIZED DATA PROCESSING, AND CONTROL METHOD OF THE DEEP NEURAL NETWORK ACCELERATOR

(71) Applicant: INDUSTRY-ACADEMIC COOPERATION FOUNDATION, YONSEI UNIVERSITY, Seoul (KR)

(72) Inventors: William Jinho Song, Seoul (KR); Bogil Kim, Seoul (KR); Chanho Park, Seoul (KR); Semin Koong, Gyeonggi-do (KR); Taesoo Lim, Seoul (KR)

(73) Assignee: INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 28 days.

(21) Appl. No.: 18/127,875

(22) Filed: Mar. 29, 2023

(65) Prior Publication Data
US 2023/0315525 A1  Oct. 5, 2023

(30) Foreign Application Priority Data
Mar. 29, 2022  (KR) .................. 10-2022-0038795
Feb. 7, 2023   (KR) .................. 10-2023-0016353

(51) Int. Cl.
*G06F 9/50*  (2006.01)

(52) U.S. Cl.
CPC .......... *G06F 9/5027* (2013.01); *G06F 9/5016* (2013.01); *G06F 9/5066* (2013.01)

(58) Field of Classification Search
None
See application file for complete search history.

(56) References Cited

U.S. PATENT DOCUMENTS 11,636,569 B1* 4/2023 Xu .................... G06N 3/08
                                              382/156
2002/0057446 A1* 5/2002 Long .................. G06F 9/3879
                                              712/E9.067

(Continued)

FOREIGN PATENT DOCUMENTS

CN    111105023 A      5/2020
KR    10-2021-0108749 A  9/2021
KR    10-2022-0025143 A  3/2022

OTHER PUBLICATIONS

Pande, S. et al., Modular Neural Tile Architecture for Compact Embedded Hardware Spiking Neural Network, 2013, Springer Science Business Media, pp. 131-153. (Year: 2013).*

(Continued)

*Primary Examiner* — Eric Coleman
(74) *Attorney, Agent, or Firm* — Sughrue Mion, PLLC

(57) ABSTRACT

Provided is a control method of a deep neural network (DNN) accelerator for optimized data processing. The control method includes, based on a dataflow and a hardware mapping value of neural network data allocated to a first-level memory, calculating a plurality of offsets representing start components of a plurality of data tiles of the neural network data, based on receiving an update request for the neural network data from a second-level memory, identifying a data type of an update data tile corresponding to the received update request among the plurality of data tiles, identifying one or more components of the update data tile, based on the data type of the update data tile and an offset of the update data tile among the calculated plurality of (Continued)

offsets, and updating neural network data of the identified one or more components between the first-level memory and the second-level memory.

19 Claims, 15 Drawing Sheets

(56) References Cited

U.S. PATENT DOCUMENTS

| | | | |
|---|---|---|---|
| 2019/0187986 A1* | 6/2019 | Tran | G06F 9/32 |
| 2021/0042115 A1* | 2/2021 | Stephens | G06F 9/30043 |
| 2021/0263865 A1 | 8/2021 | Lee et al. | |
| 2022/0075659 A1 | 3/2022 | Mohapatra et al. | |
| 2022/0076110 A1 | 3/2022 | Shao et al. | |
| 2022/0374347 A1* | 11/2022 | He | G06F 12/0207 |

OTHER PUBLICATIONS

Wei, Xuechao, et al., TGPA: Tile-Grained Pipeline Architecture for Low Latency CNN Inference, 2018, ACM, 8 pages. (Year: 2018).*
Kwon, Hyokjun, et al., Understanding Reuse, Performance, and Hardware Cost of DNN Dataflow: A Data-Centric Approach, 2019, ACM pp. 754-768. (Year: 2019).*
Garcia, R. et al., An adaptive Neural Network-Based Method for Tile Replacement in a Web Map Cache, 2011, Springer-Verlag, pp. 76-91. (Year: 2011).*
Sheng Li, et al., "CACTI-p. Architecture-Level Modeling for SRAM-based Structures with Advanced Leakage Reduction Techniques", IEEE, 2011, pp. 694-701.
Yakun Sophia Shao, et al., "Aladdin: A Pre-RTL, Power-Performance Accelerator Simulator Enabling Large Design Space Exploration of Customized Architectures", IEEE, 2014. pp. 1-12.
Kaiming He, et al., "Deep Residual Learning for Image Recognition", Computer Vision Foundation, pp. 770-778, 2016.
Christian Szegedy, et al., "Inception-v4, Inception-ResNet and the Impact of Residual Connections on Learning", cs.CV, Aug. 23, 2016, pp. 1-12.
Joseph Redmon, et al., "YOLOv3: An Incremental Improvement", cs.CV, Apr. 8, 2018, pp. 1-6.
Andrew Howard, et al., "Searching for MobileNetV3", cs.CV, Jun. 12, 2019, pp. 1-11.
Forrest N. Iandola, et al., "Squeezenet: Alexnet-Level Accuracy With 50X Fewer Parameters and <0.5MB Model Size", cs.CV, Nov. 4, 2016, pp. 1-13.
Hyoukjun Kwon, et al., "MAERI: Enabling Flexible Dataflow Mapping over DNN Accelerators via Reconfigurable Interconnects", Session 5B Neural Networks, Williamsburg, VA, Mar. 24-28, 2018, pp. 461-475.
Wenyan Lu, et al., "FlexFlow: A Flexible Dataflow Accelerator Architecture for Convolutional Neural Networks", IEEE International Symposium on High Performance Computer Architecture, 2017, pp. 553-564.
Haiping Wu, et al., "CvT: Introducing Convolutions to Vision Transformers", cs.CV, Mar. 29, 2021, pp. 1-10.

* cited by examiner

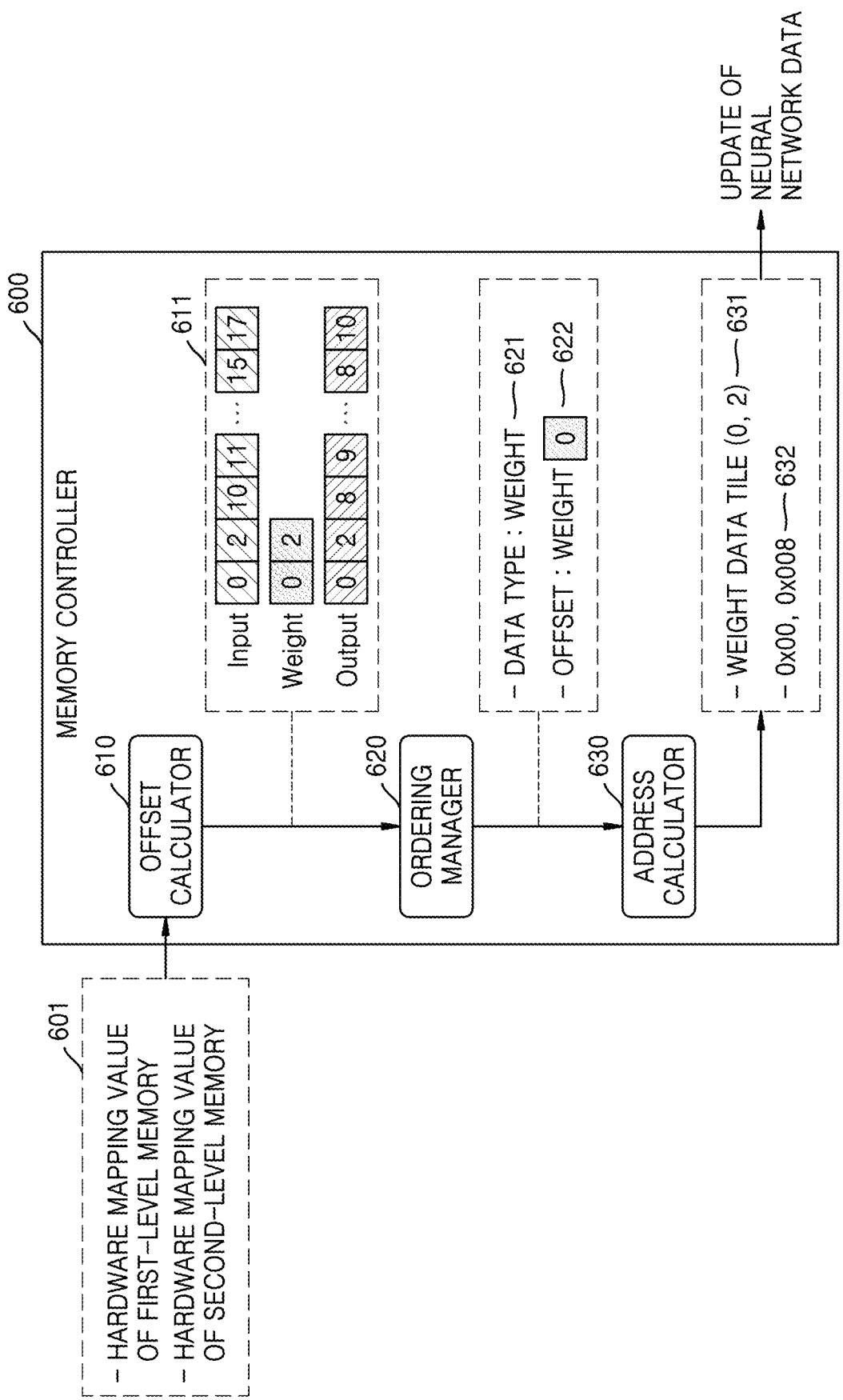

FIG. 7

Algorithm 1 Offset calculator

1: function CALCULATE_OFFSET(n,c,h,w)
2:   return n×Channel$_{lower}$×Height$_{lower}$×Width$_{lower}$+
3:        c×Height$_{lower}$×Width$_{lower}$+h×Width$_{lower}$+w
4: end function
5: function OFFSET CALCULATOR
6:   if Input stationary then ...
7:   else if Output stationary then ...
8:   else if Weight stationary then
       /* Weight-related parameters */
9:     for $k, c, r, s \leftarrow 0$ to $K_{lower}, C_{lower}, R_{lower}, S_{lower}$
10:            by $K_{upper}, C_{upper}, R_{upper}, S_{upper}$ do
         /* Calculating weight offsets */
11:      calculate_offset(k,c,r,s)
         /* Calculating number of weight operations */
12:      iteration$_w$++
13:      for $b, p, q \leftarrow 0$ to $B_{lower}, P_{lower}, Q_{lower}$
14:              by $B_{upper}, P_{upper}, Q_{upper}$ do
           /* Calculate input and output offsets */
15:        calculate_offset(b,c,h,w), calculate_offset(b,k,p,q)
           /* Calculate number of input and output operations */
16:        iteration$_i$++, iteration$_o$++
17:      end for
18:    end for
19:  end if
20: end function

FIG. 8

Algorithm 2 Ordering DNN operations $cnt_{data}$ : Currently performed operations number
$iter_{data}$ : Total number of operations
/* Algorithm for operation ordering occurred between two components */
1: function OPERATION ORDERING
2:     if Input stationary then ...
3:     else if Output stationary then ...
4:     else if Weight stationary then
5:        if $cnt_I < iter_I$ or $cnt_O < iter_O$ or $cnt_W < iter_W$ then
          /* When buffer is empty */
6:          if $cnt_I = 0$ and $cnt_O = 0$ and $cnt_W = 0$ then
7:            data_transfer(input), data_transfer(output), data_transfer(weight)
8:            $cnt_I$++, $cnt_O$++, $cnt_W$++
          /* Weight can be reused */
9:          else if $cnt_I < iter_I$ && $cnt_O < iter_O$ then
10:            data_transfer(input), data_transfer(output)
11:            $cnt_I$++, $cnt_O$++
          /* Weight is fully reused */
12:          else
13:            data_transfer(weight)
14:            $cnt_W$++, $cnt_I \leftarrow 0$, $cnt_O \leftarrow 0$
15:          end if
16:         else
          /* Reset counters and waiting for new data */
17:          $cnt_I \leftarrow 0$, $cnt_O \leftarrow 0$, $cnt_W \leftarrow 0$
18:          wait()
19:        end if
20:     end if
21: end function

Algorithm 3 Address calculator
---
1: function CALCULATE_DISTANCE(n,c,h,w)
2:     return offset + n×Channel×Height×Width +
3:         c×Height×Width + h×Width + w
4: end function
5: function ADDRESS CALCULATOR
    /* Calculate input distance */
6:     if Input data transfer then
7:         for $b, c, h, w \leftarrow 0$ to $B_{upper}, C_{upper}, H_{upper}, W_{upper}$; by 1 do
8:             calculate_distance(b,c,h,w)
9:         end for
10:    end if
    /* Calculate output distance */
11:    if Output data transfer then
12:        for $b, k, p, q \leftarrow 0$ to $B_{upper}, K_{upper}, P_{upper}, Q_{upper}$; by 1 do
13:            calculate_distance(b,k,p,q)
14:        end for
15:    end if
    /* Calculate weight distance */
16:    if Weight data transfer then
17:        for $k, c, r, s \leftarrow 0$ to $K_{upper}, C_{upper}, R_{upper}, S_{upper}$; by 1 do
18:            calculate_distance(k,c,r,s)
19:        end for
20:    end if
21: end function

FIG. 10

DNN ACCELERATOR SPECIFICATIONS

| Accelerator | Eyeriss | FlexFlow | MAERI | Fornax (this work) |
|---|---|---|---|---|
| Local buffers (I/O/W) | 24/48/448 bytes | 256/0/256 bytes | 1/0/1 bytes | 32/32/32 bytes |
| PEs (Rows×Cols) | 12×14 | 16×16 | 1×168 | 16×14 |
| Inter-PE network | 1-D network | 1-D network | 2-D network | None |
| Global buffers (I/O/W) | 100/8KB (shared I/O) | 16/32/16KB | 80KB (unified) | 128KB (unified) |
| Dataflows (LB/GLB) | WS/OS | IS,WS/OS | IS,WS/OS | IS,WS,OS/ IS,WS,OS |

Accelerator energy

DEEP NEURAL NETWORK ACCELERATOR FOR OPTIMIZED DATA PROCESSING, AND CONTROL METHOD OF THE DEEP NEURAL NETWORK ACCELERATOR

CROSS-REFERENCE TO RELATED APPLICATIONS

This application is based on and claims priority under 35 U.S.C. § 119 to Korean Patent Application No. 10-2022-0038795, filed on Mar. 29, 2022, and Korean Patent Application No. 10-2023-0016353, filed on Feb. 7, 2023 in the Korean Intellectual Property Office, the disclosures of which are incorporated by reference herein in their entireties.

BACKGROUND

1. Field

One or more embodiments relate to a deep neural network accelerator, and more particularly, to a deep neural network accelerator supporting flexible hardware mapping and dataflow for optimized data processing, and a control method of the deep neural network accelerator.

2. Description of the Related Art

In order to optimally execute various configurations and layers of a deep neural network (DNN), an accelerator that performs the workload of the DNN with various dataflows is required. To this end, in the disclosure, various efforts have been made to optimize computation by providing flexibility to a dataflow to an accelerator.

Conventionally, attempts are made to find out an execution method at the level of one's own hardware design for a small number of target workloads, by heuristically defining an order in which multidimensional data should be processed and a method in which data is tiled and spatially distributed in processing elements (PEs). However, this heuristic design strategy is unsustainable because an optimal dataflow and an optimal hardware mapping solution vary greatly depending on various workload configurations as well as hardware specifications, such as a buffer size and the number of PEs.

Recent accelerators tend to incorporate an interconnection network that is reconfigurable but is heavy between data PEs, in order to provide flexible scheduling options to a DNN. These accelerators are expensive in hardware, and must control the complexity of a Network On Chip (NoC) to activate a reconfiguration function during a hardware design. However, the accelerator's NoC takes up a significant amount of hardware overhead, and the relative contribution of the NoC overhead increases as the accelerator size (e.g., the number of PEs) expands. Thus, the entire configuration of a conventional accelerator is implemented in a biased way to support a particular type of dataflow. However, when only a flexible hardware mapping selection is provided together with an invariable dataflow, an important opportunity capable of further improving the energy efficiency and performance of accelerators is missed.

SUMMARY

Additional aspects will be set forth in part in the description which follows and, in part, will be apparent from the description, or may be learned by practice of the presented embodiments of the disclosure.

Provided is a control method of a deep neural network (DNN) accelerator. The control method may include, based on a dataflow and a hardware mapping value of neural network data allocated to a first-level memory, calculating a plurality of offsets representing start components of a plurality of data tiles of the neural network data. The control method may include, based on receiving an update request for the neural network data from a second-level memory, identifying a data type of an update data tile corresponding to the received update request among the plurality of data tiles. The control method may include identifying one or more components of the update data tile, based on the data type of the update data tile and an offset of the update data tile among the calculated plurality of offsets. The control method may include updating neural network data of the identified one or more components between the first-level memory and the second-level memory, The dataflow may include information about a data type of neural network data reused by the second-level memory among the plurality of data types of the neural network data. The hardware mapping value may include information about shapes of data tiles of neural network data allocated to the first-level memory and the second-level memory.

Provided is a DNN accelerator for optimized data processing. The DNN accelerator may include a first-level memory, a second-level memory, and at least one processor configured to control an operation of the first-level memory and an operation of the second-level memory. Based on a dataflow and a hardware mapping value of neural network data allocated to a first-level memory, the at least one processor may calculate a plurality of offsets representing start components of a plurality of data tiles of the neural network data. Based on receiving an update request for the neural network data from the second-level memory, the at least one processor may identify the data type of an update data tile corresponding to the received update request among the plurality of data tiles. The at least one processor may identify the memory address of the first-level memory to which neural network data of the update data tile has been allocated based on a data type of the update data tile and an offset of the update data tile among the plurality of offsets. The at least one processor may update neural network data stored in the identified memory address between the first-level memory and a second-level memory. The dataflow may include information about a data type of neural network data reused by the second-level memory among the plurality of data types of the neural network data. The hardware mapping value may include information about shapes of data tiles of neural network data allocated to the first-level memory and the second-level memory.

Provided is a non-transitory computer-readable recording medium having recorded thereon a program for executing at least one of the control methods of a DNN accelerator described above and to be described later.

BRIEF DESCRIPTION OF THE DRAWINGS

The above and other aspects, features, and advantages of certain embodiments of the inventive concept will be more apparent from the following description taken in conjunction with the accompanying drawings, in which:

FIG. 6 is a view for explaining a detailed structure of a memory controller according to an embodiment;

FIG. 7 is a pseudo code describing an operation of an offset calculator according to an embodiment;

FIG. 8 is a pseudo code describing an operation of an ordering manager according to an embodiment;

FIG. 9 is a pseudo code describing an operation of an address calculator according to an embodiment;

FIG. 10 is a table for comparing specifications of a DNN accelerator according to an embodiment with other DNN accelerators;

DETAILED DESCRIPTION

Figure 1:
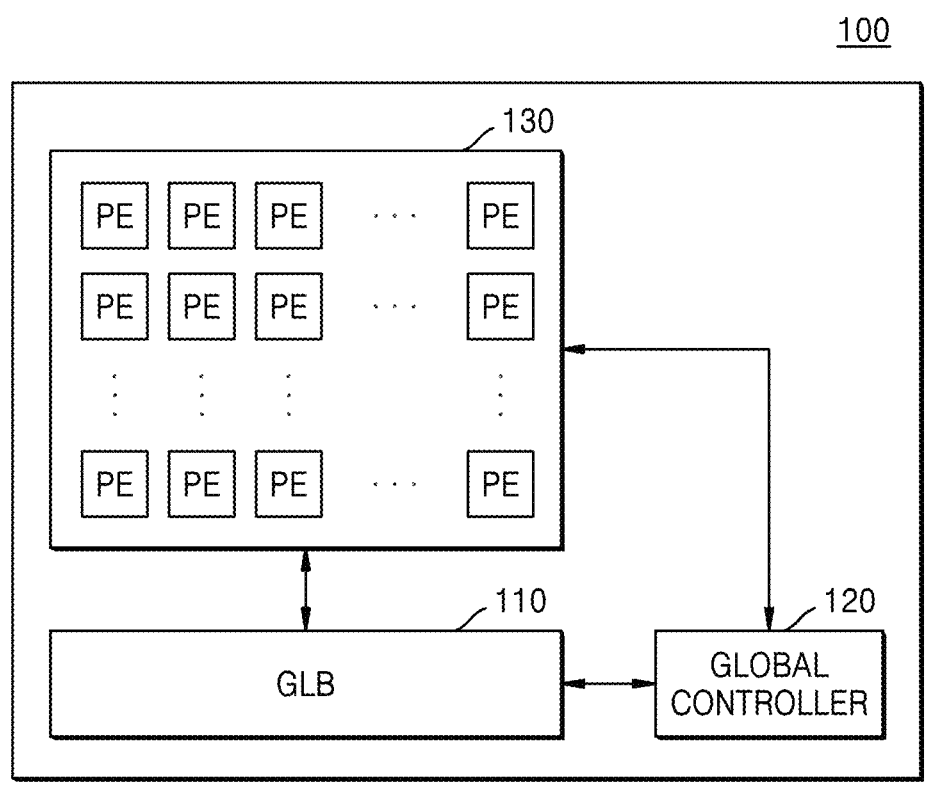
FIG. 1 is a schematic diagram of a structure of a deep neural network (DNN) accelerator according to an embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Embodiments of the disclosure will now be described more fully with reference to the accompanying drawings. However, in the following description, when there is a risk of unnecessarily obscuring the gist of the disclosure, detailed descriptions of well-known functions or configurations will be omitted.

In the accompanying drawings, identical or corresponding elements are given the same reference numerals. In addition, in the descriptions of the following embodiments, overlapping descriptions of the same or corresponding components may be omitted. However, omission of a description of a component does not intend that such a component is not included in a certain embodiment.

The advantages and features of disclosed embodiments and methods of achieving the advantages and features will become apparent with reference to embodiments of the disclosure described below with reference to the accompanying drawings. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Terms used herein will be described briefly, and embodiments will be described in detail. Although general terms widely used at present were selected for describing the disclosure in consideration of the functions thereof, these general terms may vary according to intentions of one of ordinary skill in the art, case precedents, the advent of new technologies, and the like. Terms arbitrarily selected by the applicant of the disclosure may also be used in a specific case. In this case, their meanings need to be given in the detailed description. Hence, the terms must be defined based on their meanings and the contents of the entire specification, not by simply stating the terms.

An expression used in the singular encompasses a plurality of expressions unless it is clearly indicated as being singular in the context. A plurality of expressions encompass a singular expression unless they are clearly indicated as being plural in the context. The terms "comprises" and/or "comprising" or "includes" and/or "including" when used in this specification, specify the presence of stated elements, but do not preclude the presence or addition of one or more other elements.

A 'neural network' is a representative example of an artificial neural network model simulating a brain nerve, and is not limited to an artificial neural network model using a specific algorithm. According to an embodiment, a neural network may also be referred to as a deep neural network.

A 'neural network accelerator' used herein may refer to a processor specially optimized to process a deep neural network workload or an electronic device including the processor. According to an embodiment, a neural network accelerator may also be referred to as a deep neural network accelerator.

A 'workload' used herein may refer to data processing of performing an operation on one or more layers constituting a neural network.

A 'memory' used herein may be interpreted broadly to include any electronic component capable of storing electronic information. The 'memory' may refer to various types of processor-readable media, such as random access memory (RAM), static random access memory (SRAM), dynamic random access memory (DRAM), read-only memory (ROM), non-volatile random access memory (NVRAM), programmable read-only memory (PROM), erasable-programmable read-only memory (EPROM), electrically erasable PROM (EEPROM), flash memory, magnetic or optical data storage, and registers. However, embodiments are not necessarily limited thereto. A memory buffer may be stated to be in electronic communication with a processor (or a memory controller) when the processor (or the memory controller) is able to read and/or write information from and/or to the memory.

According to an embodiment, the 'memory' may refer to a memory hierarchy or one level memory among a plurality of level memories forming the memory hierarchy. For example, the memory hierarchy of a deep neural network accelerator may include from DRAM, which is off-chip memory, to a global buffer (GLB), a local buffer (LB), and a register, which are on-chip memory, and the 'memory' may refer to all of them or to a specific level memory included in a memory hierarchy corresponding to one of them. A data processing command transmitted to the 'memory' or a data processing command received from the 'memory' may refer to transmission and reception by a 'memory controller' that controls an operation of the 'memory'.

'Neural network data' used herein may refer to data used or created while a deep neural network accelerator is performing a workload. The neural network data, which is a tensor having one or more dimensions, may be stored in at least one memory included in the deep neural network accelerator.

'Neural network data' used herein may have one data type among a plurality of data types. The plurality of data types may include an input data type, a weight data type, and an output data type. According to an embodiment, a 'data tile' may refer to a tensor corresponding to a portion of a tensor including the entire neural network data. Because the entire neural network data is a large-scale multi-dimensional tensor, the entire neural network data may be allocated to a plurality of level memories of a memory hierarchy in units of data tiles, or may be updated between different level memories.

'Update of neural network data' used herein may refer to a lower-level memory (or a lower-level memory controller), in response to an update request, transmitting neural network data of an update data tile corresponding to the update request among the neural network data stored in the lower-level memory to an upper-level memory or storing neural network data received from the upper-level memory in an update data tile.

FIG. 1 is a schematic diagram of a structure of a deep neural network (DNN) accelerator 100 according to an embodiment. As shown in FIG. 1, the DNN accelerator 100 may include a GLB 110, a global controller 120, and a processing element (PE) array 130.

The DNN accelerator 100 may refer to a processor optimized to process a DNN's workload or an electronic device including the processor.

The GLB 110 may store neural network data necessary for performing a workload of the DNN accelerator 100. According to an embodiment, the GLB 110 may be one of a plurality of level memories of a memory hierarchy of the DNN accelerator 100. The GLB 110 may be connected to other level memories of the memory hierarchy and transmit and receive the neural network data.

The global controller 120 may be a memory controller that controls an operation of the GLB 110 to perform the workload of a DNN. The global controller 120 may control transmission/reception of the neural network data stored in the GLB 110 to perform the workload of the DNN.

According to an embodiment, the global controller 120 may receive an update request for neural network data from at least one PE included in the PE array 130. In response to the update request, the global controller 120 may update the neural network data corresponding to the update request among the neural network data stored in the GLB 110, between the GLB 110 and an upper-level memory (e.g. an LB) included in the at least one PE. According to an embodiment, the global controller 120 may transmit the update request for neural network data to a memory at a lower-level than the GLB 110 in the memory hierarchy or to a memory controller for controlling an operation of the lower-level memory, and may store neural network data transmitted in response to the update request in the GLB 110. For example, the global controller 120 may transmit an update request for new neural network data to a memory at a lower-level than the GLB 110, when all of the neural network data allocated to the GLB 110 is updated.

The PE array 130 may include at least one PE. Each PE may perform a DNN workload based on the neural network data received from the GLB 110. A plurality of PEs include an LB (not shown) in which neural network data is stored, an LB controller (not shown) for controlling transmission/reception of the neural network data stored in the LB, and at least one operator (not shown). Details thereof are described below with reference to FIG. 2.

According to an embodiment, because the size of a plurality of level memories included in the DNN accelerator 100 is limited, neural network data may be allocated to the plurality of level memories, as a data tile that is a portion of the entire neural network data, while a workload is being performed. A determination as to what shape of data tile is to be allocated to each of the plurality of level memories may be referred to as hardware mapping of neural network data. A hardware mapping value including information about the shape of the data tile allocated to each of the plurality of level memories may be determined based on the hardware mapping of neural network data. Details thereof are described below with reference to FIG. 3.

According to an embodiment, while the DNN accelerator 100 is performing a workload, updating of neural network data may occur several times between adjacent level memories of the memory hierarchy. In this process, some of the neural network data updated in an upper-level memory may be reused, and an order among a plurality of update data tiles that are updated may be determined according to the data types of the neural network data that are reused. In this case, a movement of neural network data determined according to which data type among a plurality of data types of neural network data is reused may be referred to as a dataflow. For example, the dataflow may include at least one of an input stationary (IS) dataflow formed as input data is reused, a weight stationary (WS) dataflow formed as weight data is reused, and an output stationary (OS) dataflow formed as output data is reused. As such, the dataflow of neural network data may include information about a data type of neural network data that is reused in an upper-level memory among adjacent level memories of a memory hierarchy in which updating of neural network data is performed.

According to an embodiment, the energy efficiency and performance of the DNN accelerator 100 are determined according to how the hardware mapping and dataflow of neural network data allocated to a specific level memory are selected. The energy efficiency of a DNN accelerator relates to the energy necessary for the DNN accelerator to perform an operation on a DNN layer, and good or high energy efficiency may mean that the energy necessary for performing all operations on a specific layer is low. The performance of the DNN accelerator relates to a data processing cycle (or time) necessary for the DNN accelerator to perform an operation on a layer, and good or high performance may mean that a data processing cycle necessary for performing all operations on a specific layer is low. In other words, it is important for the DNN accelerator 100 to select optimal hardware mapping and an optimal dataflow in order to achieve at least one of high energy efficiency and high performance. Hardware mapping and a dataflow capable of achieving optimal energy efficiency and/or performance of the DNN accelerator may vary according to the hardware specifications of the DNN accelerator 100 and/or the structure of the DNN layer. In other words, the DNN accelerator needs to be able to support a flexible dataflow and flexible hardware mapping in order to secure versatility for various DNN layers and achieve optimal energy efficiency and performance for various hardware specifications.

According to an embodiment, based on a dataflow and a hardware mapping value of neural network data allocated to a first-level memory, the DNN accelerator 100 may calculate a plurality of offsets representing start components of a plurality of data tiles of the neural network data. According to an embodiment, based on receiving an update request for the neural network data from a second-level memory, the DNN accelerator 100 may identify the data type of an update data tile corresponding to the received update request among the plurality of data tiles. According to an embodiment, the DNN accelerator 100 may identify one or more components of the update data tile, based on the data type of the update data tile and an offset of the update data tile among the calculated plurality of offsets. According to an embodiment, the DNN accelerator 100 may update neural network data of the identified one or more components between the first-level memory and the second-level memory. Details thereof are described below with reference to the following drawings.

Figure 2:
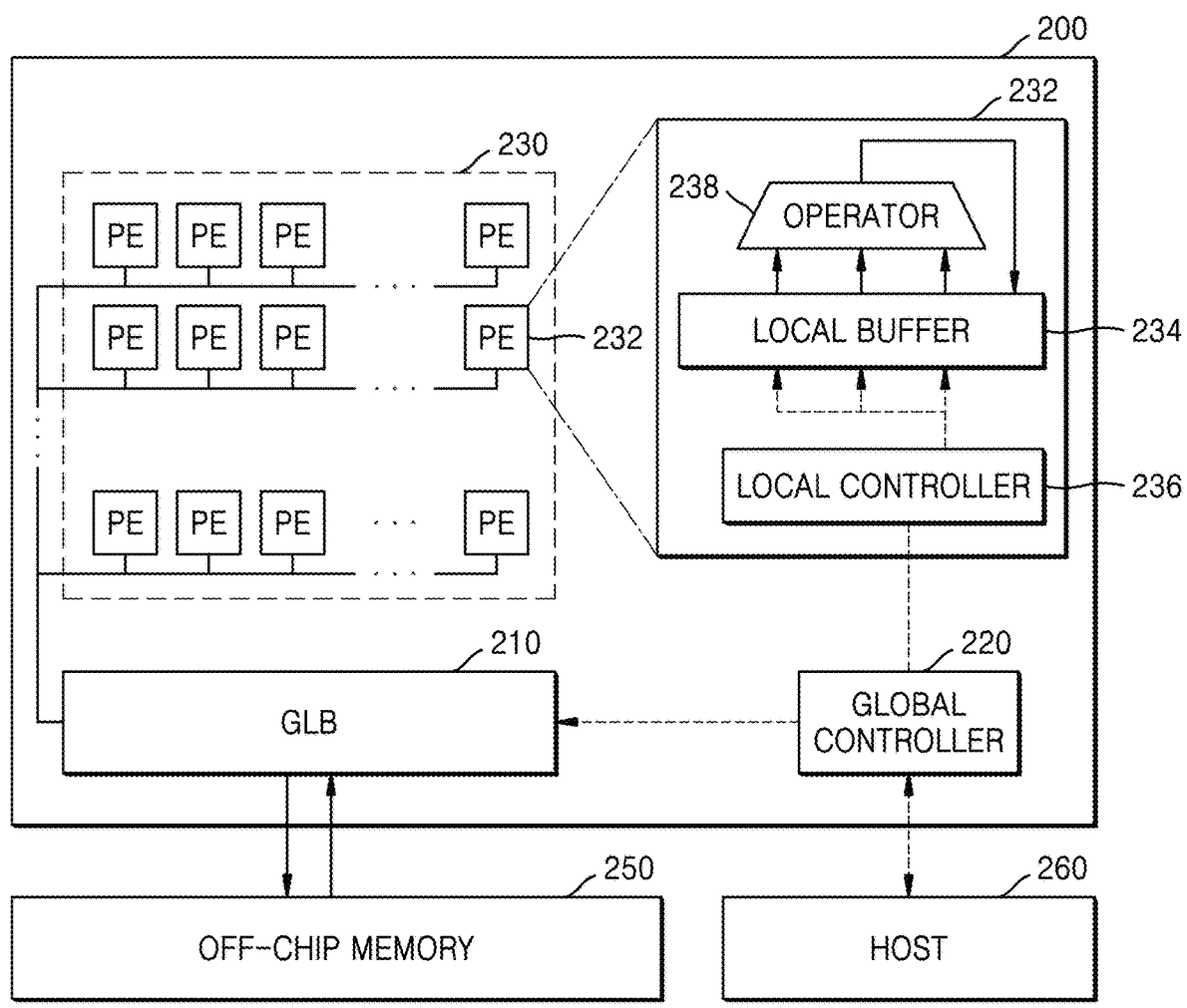
FIG. 2 is a block diagram of a detailed structure of a DNN accelerator according to an embodiment.

FIG. 2 is a block diagram of a detailed structure of a DNN accelerator according to an embodiment. As shown in FIG. 2, a DNN accelerator 200 may include a GLB 210, a global controller 220, and a PE array 230. The DNN accelerator 200, the GLB 210, the global controller 220, and the PE array 230 may correspond to the DNN accelerator 100, the GLB 110, the global controller 120, and the PE array 130 of FIG. 1, respectively.

The PE array 230 may include a plurality of PEs. A PE 232 among the plurality of PEs may perform a DNN workload based on neural network data received from the GLB 210. The PE may include a LB 234 in which neural network data is stored, a local controller 236 for controlling transmission/reception and storage of the neural network data stored in the LB 234, and at least one operator 238.

The LB 234 may store neural network data necessary for performing a DNN workload. According to an embodiment, the LB 234 is one of a plurality of level memories of a memory hierarchy of the DNN accelerator 200, and may be a memory at an upper-level than the GLB 210. According to an embodiment, the LB 234 may be connected to other level memories of the memory hierarchy of the DNN accelerator 200 and may transmit and receive neural network data.

The local controller 236 may control an operation of the LB 234 to perform the workload of a DNN. The local controller 236 may control transmission/reception of the neural network data stored in the LB 234 to perform the workload of the DNN.

According to an embodiment, the local controller 236 may receive an update request for neural network data from an upper-level memory. In response to the update request, the local controller 236 may update the neural network data corresponding to the update request between the LB 234 and a register (not shown) that is an upper-level memory included in the operator 238. According to an embodiment, when the workloads for the neural network data allocated to a current LB 234 are all performed, the local controller 236 may transmit an update request for neural network data to the global controller 220, which is a lower-level memory, to perform a next workload. The operator 238 may receive the neural network data from the LB 234 and perform a DNN workload. According to an embodiment, the operator 238 may include a multiply-and-accumulate (MAC) operator (not shown), a register (not shown) in which neural network data is stored, and a register controller (not shown) for controlling transmission and reception of the neural network data stored in the register.

The register may store neural network data necessary for performing a DNN workload. According to an embodiment, the register is one of the plurality of level memories of the memory hierarchy of the DNN accelerator 200, and may be a memory at an upper-level than the LB 234. According to an embodiment, the register may be connected to other level memories of the memory hierarchy of the DNN accelerator 200 and may transmit and receive neural network data.

The register controller may control operations of the register to perform a workload of the DNN accelerator 200. The register controller may control transmission/reception of the neural network data stored in the register to perform the workload of the DNN.

According to an embodiment, when all of the workloads for the neural network data allocated to the current register are performed, the register controller may transmit an update request for neural network data to the local controller 236, which is a lower-level memory, to perform a next workload.

According to an embodiment, the PE array 230 may include a plurality of PEs. For example, the PE array 230 may include a structure in which PEs are arranged in 16*14. However, embodiments are not necessarily limited thereto, and the number and arrangement of PEs included in the PE array 230 may be variously selected.

According to an embodiment, the plurality of PEs may perform DNN workloads in parallel. The plurality of PEs (or a plurality of local controllers included in the plurality of PEs) may transmit an update request for global controller neural network data. According to an embodiment, in response to the update request, the global controller 220 may update neural network data of an update data tile between the GLB 210 and LBs included in the plurality of PEs.

According to an embodiment, an interconnection network (hereinafter referred to as an interconnection network) for transmitting and receiving neural network data between PEs including different LBs may not exist. The interconnection network is a configuration that may help reduce the number of accesses to lower-level memory through sharing of neural network data of the plurality of PEs or increase the flexibilities of hardware mapping and a dataflow, but may decrease design efficiency due to an increase in the complexity of hardware and increase design costs. However, the DNN accelerator 200 according to an embodiment may flexibly control hardware mapping and a dataflow even when an interconnection network does not exist. As such, because the DNN accelerator 200 according to an embodiment may perform neural network calculations according to hardware mapping and a dataflow that satisfy at least one of optimal energy efficiency and optimal performance while eliminating interconnection networks, energy efficiency and performance may be secured and also design efficiency may be increased, and design costs may be lowered. Because an interconnection network is removed and thus the hardware size is reduced, the application field of the DNN accelerator 200 may be further expanded.

According to an embodiment, the LB 234 may include individual buffers having the same sizes to which a plurality of data types of neural network data are allocated, respectively. In other words, the LB 234 may include an input data buffer to which input data is allocated, a weight data buffer to which weight data is allocated, and an output data buffer to which output data is allocated, and each of the buffers may have the same size.

According to an embodiment, the LB 234 may include an input data buffer, a weight data buffer, and an output data buffer each having a size of 32 bytes. However, this is an example selected empirically in consideration of experimental results for achieving optimal energy efficiency and/or performance of a DNN accelerator, and the sizes of the individual buffers of the plurality of data types included in the LB 234 is not limited to 32 bytes. Of course, other sizes may be selected based on at least one of hardware design costs, energy efficiency, and performance of the DNN accelerator 200.

According to an embodiment, the GLB 210 may include a unified buffer that shares regions to which neural network data of the plurality of data types are allocated. In other words, a sum of the sizes of the regions to which the neural network data of the plurality of data types are allocated may be flexibly set within the size of the GLB 210. In general, the larger the region to which neural network data reused according to the dataflow is allocated is, the greater the re-use efficiency of neural network data is. When the GLB 210 is composed of individual buffers with a limited size to which only neural network data of a specific data type is allocated, the size of the region to which neural network data reused according to a specific dataflow is allocated is also limited to the size of an individual buffer, and thus the efficiency of neural network data reuse may decrease. On the other hand, when the GLB 210 is composed of a unified buffer, the size of the region to which the neural network data reused according to a specific dataflow is allocated may be flexibly set within the size of the GLB 210, and thus the reuse efficiency of neural network data may be increased. As such, because the GLB 210 includes a unified buffer, the DNN accelerator 200 according to an embodiment may increase the reuse efficiency of neural network data regardless of the type of dataflow.

According to an embodiment, the GLB 210 may be composed of a unified buffer having a size of 128 KB. However, this is an example selected empirically in consideration of experimental results for achieving optimal energy efficiency and/or performance of a DNN accelerator, and the size of the GLB 210 is not limited to 128 KB. Of course, other sizes may be selected based on at least one of hardware design costs, energy efficiency, and performance of the DNN accelerator 200.

According to an embodiment, the DNN accelerator 200 may be connected to an off-chip memory 250 and a host 260 to perform a DNN workload. However, embodiments are not limited thereto, and the DNN accelerator 200 may include at least one of the off-chip memory 250, an off-chip memory controller controlling the off-chip memory 250, and the host 260.

The off-chip memory 250 may store neural network data necessary for performing a DNN workload. According to an embodiment, the off-chip memory 250 is one of a plurality of level memories of the memory hierarchy of the DNN accelerator 200, and may be a memory at a lower-level than the GLB 210. Neural network data stored in the off-chip memory 250 may be updated between the off-chip memory 250 and the GLB 210, based on an update request for neural network data of the global controller 220. According to an embodiment, transmission and reception of the neural network data stored in the off-chip memory 250 may be controlled by an off-chip memory controller (not shown), and the update request for the neural network data of the global controller 220 may be transmitted to the off-chip memory controller.

The host 260 may include a device driver or compiler that identifies at least one of a dataflow and a hardware mapping value for a layer on which an operation is performed. According to an embodiment, the host 260 may transmit a data processing command for controlling an operation of the DNN accelerator 200 to a memory controller that controls each of the plurality of level memories of the memory hierarchy of the DNN accelerator 200. According to an embodiment, the data processing command may include information about at least one of a dataflow and a hardware mapping value of neural network data allocated to a corresponding level memory. The information about the hardware mapping value may refer to information about the hardware mapping value itself or may refer to information about the shape of a data tile of neural network data allocated to a memory necessary for determining the hardware mapping value. According to an embodiment, the information about at least one of the dataflow and the hardware mapping value included in the data processing command may be determined and transmitted differently for each of a plurality of level memories to which the data processing command is transmitted.

According to an embodiment, at least one of the dataflow and the hardware mapping value may be determined based on at least one of energy and a data processing cycle that are necessary for an operation of the DNN accelerator 200. According to an embodiment, the host 260 may calculate at least one of energy and a data processing cycle that are needed by the DNN accelerator 200 to perform an operation of a specific layer for a plurality of combinations created by various hardware mapping options and various dataflow options that may be implemented in the DNN accelerator 200.

According to an embodiment, the host 260 may identify at least one of a hardware mapping value and a dataflow for optimal data processing, based on the calculated at least one of the energy and the data processing cycle. For example, the host 260 may identify a combination for which the energy or data processing cycle needed by the DNN accelerator 200 to perform the operation is lowest or smallest among the plurality of combinations created by various hardware mapping options and various dataflow options, and may transmit a data processing command including information about a hardware mapping value and a dataflow of the identified combination to memory controllers that control operations of the plurality of level memories. However, embodiments are not necessarily limited to the above example, and the identified combination may be, among the plurality of combinations, one of combinations in which at least one of the energy and the data processing cycle needed by the DNN accelerator 200 to perform an operation falls within a pre-set rank.

According to an embodiment, the global controller 220 may control the GLB 210 based on a command received from the host 260. The global controller 220 may determine at least one of a data tile shape and a dataflow of the neural network data allocated to the GLB 210, based on the data processing command received from the host 260. For example, in an operation of calculating one of a plurality of layers of a deep neural network, the data processing command of the host 260 may include information indicating that the dataflow of neural network data is a WS dataflow. The data processing command of the host 260 may include information indicating that an input data tile of the neural network data allocated to the GLB 210 is a tensor of ($5 \times 5 \times 1 \times 1$), a weight data tile is a tensor of ($2 \times 2 \times 1 \times 1$), and an output data tile is a tensor of ($2 \times 2 \times 1 \times 1$), or a hardware mapping value including the information. However, embodiments are not necessarily limited to the above example, and the above description is equally applicable to at least one of other memory controllers that receive the data processing command from the host 260, for example, an off-chip memory controller, a local controller, and a register controller. Thus, overlapping descriptions thereof will be omitted.

As such, the DNN accelerator 200 according to an embodiment may flexibly change hardware mapping and dataflow of the neural network data allocated to the plurality of level memories in order to perform optimized data processing. A detailed method of updating neural network data between adjacent level memories in order for the DNN accelerator 200 to perform a DNN workload based on flexibly changed hardware mapping and a flexibly changed dataflow will now be described with reference to the following drawings.

Figure 3:
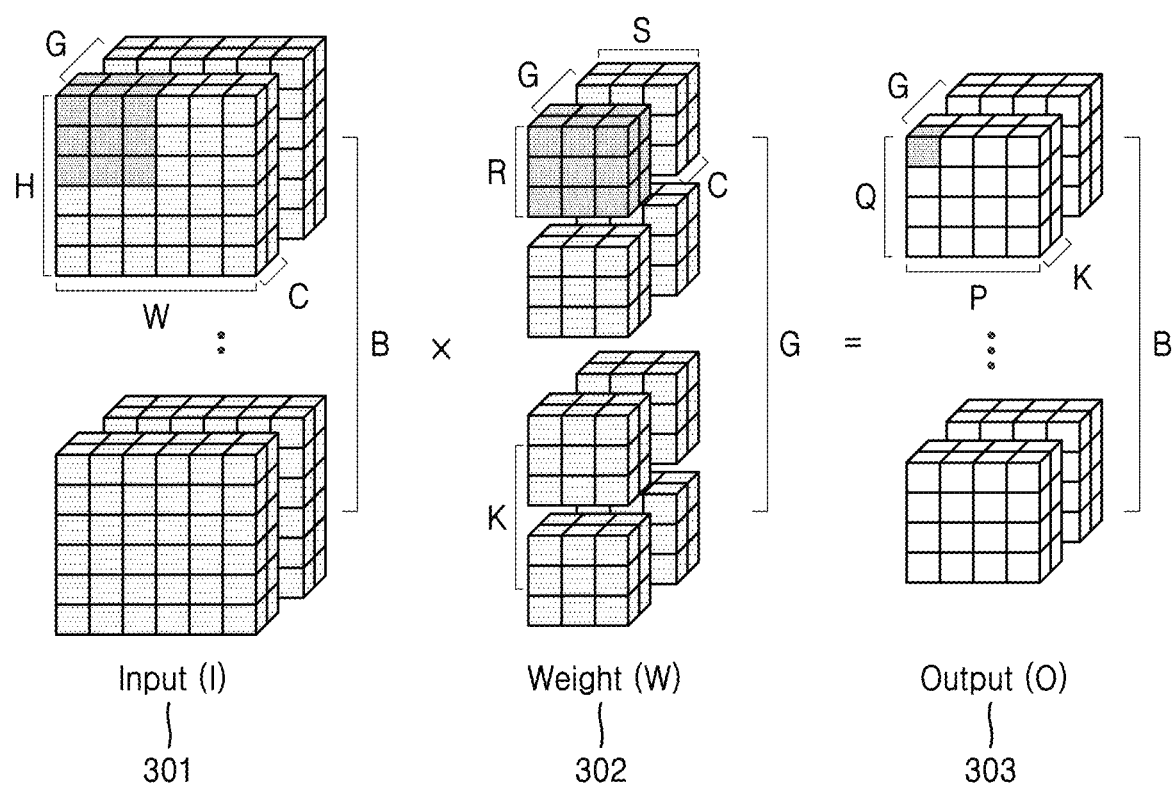
FIG. 3 is a view for explaining a hardware mapping value according to an embodiment.

FIG. 3 is a view for explaining a hardware mapping value according to an embodiment.

Referring to FIG. 3, neural network data of a convolution layer allocated to one of a plurality of level memories of a plurality of memory hierarchies of a DNN accelerator may be checked.

According to an embodiment, a neural network operation of generating output data 303 by performing a convolution operation on input data 301 and weight data 302 may be performed in the convolution layer. At this time, there may be neural network parameter values related to the type of each neural network data for each data type. The neural network parameter values may refer to hardware mapping values that are determined by hardware mapping. In other words, a hardware mapping value of neural network data allocated to a specific level memory may include information about a data tile shape of neural network data allocated to the specific level memory.

In detail, neural network parameters may include a plurality of input data parameters related to the factor of the input data 301, a plurality of weight data parameters related to the factor of the weight data 302, and a plurality of output data parameters related to the factor of the output data 303.

The input data parameters may include parameters related to at least one of a batch size B, an input channel C, a group size G, an input height H, and an input width W of the input data 301.

The weight data parameters may include parameters related to at least one of a weight channel C, a group size G, a weight count K, a weight height R, and a weight width S of the weight data 302.

The output data parameters may include parameters related to at least one of a batch size B, a group size G, an output count K, an output height Q, and an output width P of the output data 303.

According to an embodiment, at least one of a plurality of parameters of the neural network data may be derived from at least one other parameter. For example, as shown in FIG. 3, parameters related to the height H and the width W of the input data 301 may derived from at least one other parameter. For example, the height H and the width W of the input data 301 may be calculated according to an equation $W=(P-1) \times stride + R$ and an equation $H=(Q-1) \times stride + S$. However, embodiments of the present invention are not limited thereto.

Figure 4:
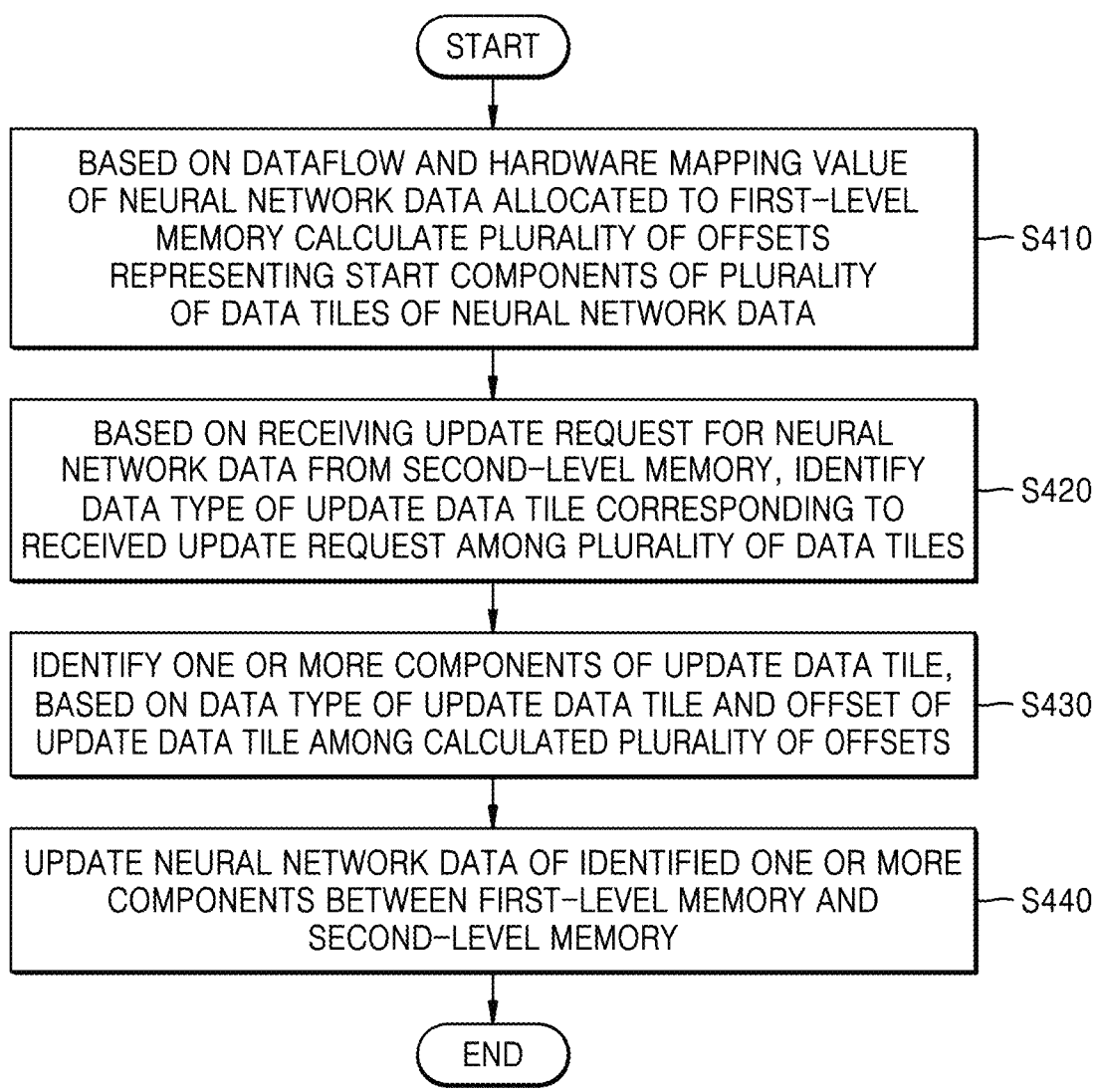
FIG. 4 is a flowchart of an operation method of a DNN accelerator, according to an embodiment.

FIG. 4 is a flowchart of an operation method of a DNN accelerator, according to an embodiment. The operations shown in FIG. 3 may be performed by the DNN accelerator 100 shown in FIG. 1, the DNN accelerator 200 shown in FIG. 2, a DNN accelerator 1300 shown in FIG. 13, and at least one processor 1310 shown in FIG. 13.

In operation S410, based on a dataflow and a hardware mapping value of neural network data allocated to the first-level memory, the DNN accelerator may calculate a plurality of offsets representing start components of a plurality of data tiles of the neural network data. According to an embodiment, the DNN accelerator may store the calculated plurality of offsets in a queue data type structure. The plurality of data tiles may refer to one or more components updated between the first-level memory and the second-level memory in response to an update request of the second-level memory among a plurality of components of neural network data allocated to the first-level memory.

According to an embodiment, based on a hardware mapping value of each of the plurality of data types of the neural network data, the DNN accelerator may calculate the plurality of offsets for the plurality of data types of the neural network data. The DNN accelerator may identify a plurality of components of an update data tile, based on a plurality of offsets for a data type of an update data tile among the calculated plurality of offsets.

According to an embodiment, the first-level memory and the second-level memory may be one of the plurality of level memories of the memory hierarchy of the DNN accelerator, and the second-level memory may be a memory at an upper-level than the first-level memory. For example, the first-level memory and the second-level memory may be a GLB and an LB. However, embodiments are not necessarily limited to the above example, and the first-level memory and the second-level memory may be an LB and a register or may be DRAM and a GLB.

According to an embodiment, the dataflow may include information about a data type of neural network data reused by the second-level memory among the plurality of data types of the neural network data. According to an embodiment, the hardware mapping value may include information about the shapes of data tiles of neural network data allocated to the first-level memory and the second-level memory. According to an embodiment, at least one of the dataflow and the hardware mapping value may be determined based on at least one of energy and a data processing cycle that are necessary for an operation of the DNN accelerator.

In operation S420, based on receiving an update request for the neural network data from the second-level memory, the DNN accelerator identifies the data type of an update data tile corresponding to the received update request among the plurality of data tiles. According to an embodiment, the DNN accelerator may receive an update request for the neural network data from the second-level memory, and, based on receiving the update request for the neural network data, may identify the data type of an update data tile to be updated according to the received update request among the plurality of data tiles of the neural network data allocated to the first-level memory.

According to an embodiment, the DNN accelerator may calculate the required number of updates and the cumulative number of updates of the plurality of data types of the neural network data. The required number of updates may refer to the number of times the neural network data needs to be updated in order to perform a workload on the neural network data stored in the first-level memory. The cumulative number of updates of the neural network data may refer to the number of times the neural network data has been updated in response to an update request while a workload is being performed on the neural network data allocated to the first-level memory. According to an embodiment, the required number of updates and the cumulative number of updates may be calculated differently for a data type corresponding to the dataflow and data types other than the data type corresponding to the dataflow. According to an embodiment, the DNN accelerator may identify the data type of the update data tile, based on the required number of updates and the cumulative number of updates at a time point when the update request is received.

In operation S430, the DNN accelerator identifies one or more components of the update data tile, based on the data type of the update data tile and an offset of the update data tile among the calculated plurality of offsets. The one or more components of the update data tile may include at least one component of the neural network data allocated to the first-level memory.

According to an embodiment, the DNN accelerator may calculate a distance to the offset, based on the hardware mapping value of the identified data type. The distance to the offset may include information about how far the one or more components of the update data tile are from the offset based on the data tile allocated to the first-level memory. According to an embodiment, the DNN accelerator may identify a component spaced apart from the offset by the distance to the offset as the one or more components of the update data tile.

In operation S440, the DNN accelerator may update neural network data of the identified one or more components between the first-level memory and the second-level memory. There are a plurality of memory addresses corresponding to a plurality of components of the data tile allocated to the first-level memory, and the DNN accelerator may identify the one or more components of the update data tile to identify a memory address where neural network data of the components are stored. The DNN accelerator may update the update data tile between the first-level memory and the second-level memory by accessing a memory address where the one or more components of the update data tile are stored.

Figure 5:
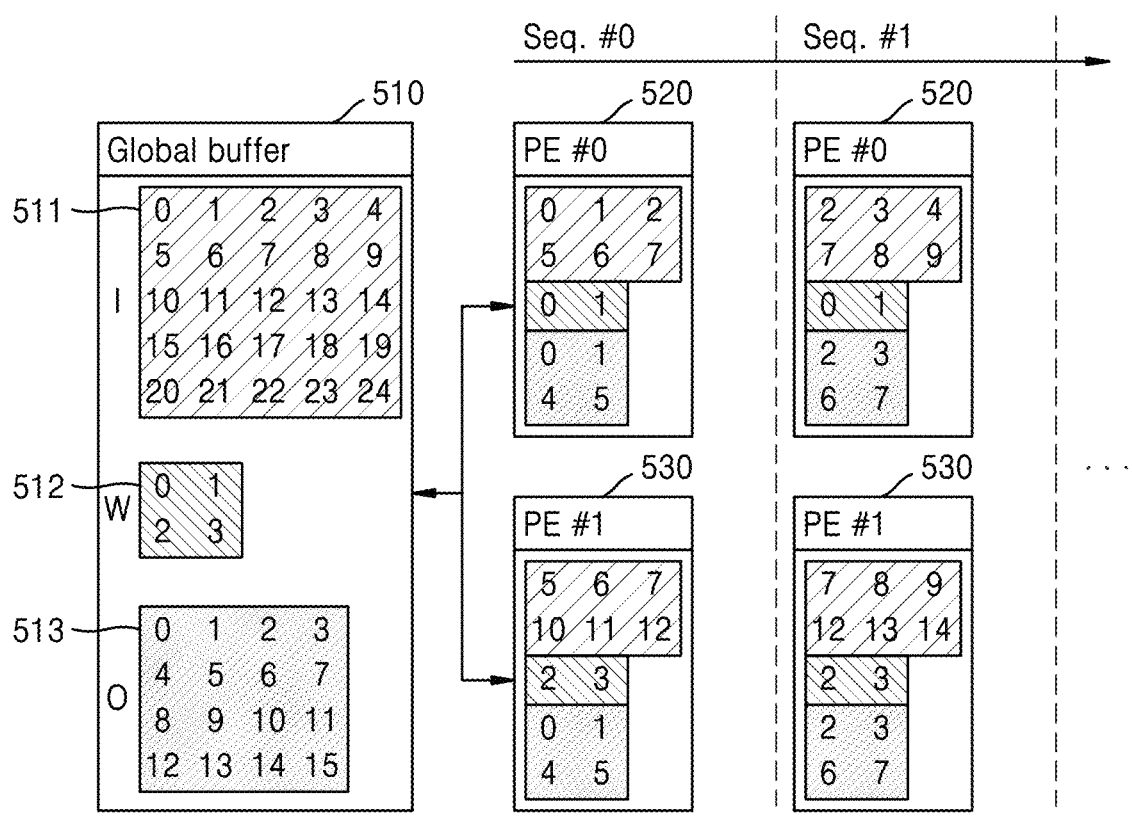
FIG. 5 is a diagram for explaining neural network data updated between a global buffer and a local buffer, according to an embodiment.

FIG. 5 is a diagram for explaining neural network data updated between a GLB and an LB, according to an embodiment.

Referring to FIG. 5, neural network data may be allocated to a GLB 510. For example, an input data tile 511 may be allocated in the form of (5×5×1×1) to the GLB 510, a weight data tile 512 may be allocated in the form of (2×2×1×1), and an output data tile 513 may be allocated in the form of (4×4×1×1). A plurality of numbers included in a data tile allocated to the GLB 510 shown in FIG. 5 may refer to an index of each of a plurality of components constituting the data tile. The input data tile 511, the weight data tile 512, and the output data tile 513 allocated to the GLB 510 may be neural network data updated between DRAM (not shown), which is a memory at a lower-level than the GLB 510, and the GLB 510.

According to an embodiment, a global controller controlling the GLB 510 may receive an update request for neural network data from a first local controller controlling a first LB 520 included in a first processing element and a second local controller controlling a second LB 530 included in a second processing element. In response to the update request, the global controller may group some of the neural network data allocated to the GLB 510 into an update data tile, and may update the update data tile between the GLB 510, the first LB 520 included in the first processing element, and the second LB 530 included in the second processing element. For example, as shown in FIG. 5, in Seq. #0, the neural network data of components (0, 1, 2, 5, 6, 7) of the input data tile 511, components (0, 1) of the weight data tile 512, and components (0, 1, 4, 5) of the output data tile 513 may be updated between the GLB 510 and the first LB 520. In Seq. #0, the neural network data of components (5, 6, 7, 10, 11, 12) of the input data tile 511, components (2, 3) of the weight data tile 512, and components (0, 1, 4, 5) of the output data tile 513 may be updated between the GLB 510 and the second LB 530. A set of a plurality of components in which neural network data to be updated is located may be referred to as an update data tile.

According to an embodiment, when the workloads for the neural network data updated in the first LB 520 and the second LB 530 are all performed, the first local controller and the second local controller may transmit an update request for neural network data to the global controller 220 to perform a next workload. For example, when workloads for neural network data updated between the GLB 510 and the first and second LBs 520 and 530 are all performed in Seq. #0, another neural network data may be updated between the GLB 510 and the first and second LBs 520 and 530 in Seq. #1, and thus, a next workload may be performed.

According to an embodiment, the order of neural network data updated between the GLB 510 and the first and second LBs 520 and 530 may be determined according to the dataflow of neural network data. For example, assuming that the dataflow of neural network data is a WS dataflow as shown in FIG. 5, only input data and output data are updated until the workloads for updated weight data updated in the first LB 520 and the second LB 530 are all performed, and weight data is not updated. In other words, input data, weight data, and output data are updated between the GLB 510 and the first and second LBs 520 and 530 in response to an update request at Seq. #0, and input data and output data are updated in response to an update request at Seq. #1.

According to an embodiment, the DNN accelerator may identify a plurality of components of an update data tile corresponding to an update request and update neural network data of the identified plurality of components. Details thereof will now be described with reference to the following drawings.

FIG. 6 is a view for explaining a detailed structure of a memory controller according to an embodiment.

Referring to FIG. 6, a memory controller 600 may include an offset calculator 610, an ordering manager 620, and an address calculator 630. The memory controller 600 may control an operation of at least one of a plurality of level memories of the memory hierarchy of a DNN accelerator. For example, the memory controller 600 may be at least one of a register controller, a local controller, a global controller, and a DRAM controller.

Before performing an operation on a specific layer of the DNN accelerator, the offset calculator 610 may calculate a plurality of offsets for the specific layer on which an operation is performed. According to an embodiment, the offset calculator 610 may calculate the plurality of offsets, based on a hardware mapping value of a first-level memory and a hardware mapping value of a second-level memory included in a data processing command 601 received by the memory controller 600. The offset calculator 610 may store the calculated plurality of offsets in a queue 611, and may transmit the queue 611 including the plurality of offsets to the ordering manager 620. A detailed operation of the offset calculator 610 is described below with reference to FIG. 7.

The ordering manager 620 may determine a movement order of neural network data on which an update is performed according to an update request. According to an embodiment, in response to an update request for the neural network data received by the memory controller 600, the ordering manager 620 may identify a data type 621 of an update data tile corresponding to the received update request. The ordering manager 620 may obtain an offset 622 of an update data tile from among the plurality of offsets stored in the queue 611 received from the offset calculator

610. The ordering manager 620 may transmit the identified data type 621 of the update data tile and the obtained offset 622 of the update data tile to the address calculator 630. A detailed operation of the ordering manager 620 is described below with reference to FIG. 8.

The address calculator 630 may calculate a memory address where neural network data of the update data tile corresponding to the update request is stored. According to an embodiment, the address calculator 630 may identify one or more components 631 of the update data tile and a memory address 632 to which the one or more components are allocated, based on the data type 621 of the update data tile and the offset 622 of the update data tile both received from the ordering manager 620. The memory controller 600 may update the neural network data of the update data tile between the first-level memory and the second-level memory, based on the identified memory address. A detailed operation of the address calculator 630 is described below with reference to FIG. 9.

FIG. 7 is pseudo code describing an operation of the offset calculator 610 according to an embodiment. The pseudo code of FIG. 7 is an example of an algorithm in which the offset calculator 610 of FIG. 6 calculates a plurality of offsets, when it is assumed that a dataflow is a WS dataflow. When the dataflow is an IS dataflow or an OS dataflow, a for loop statement based on a hardware mapping value related to the dataflow may be located outside, and a for loop statement based on a hardware mapping value not related to the dataflow may be located inside. The hardware mapping values included in FIG. 7 may correspond to the hardware mapping values described above with reference to FIG. 3.

According to an embodiment, based on a hardware mapping value of each of a plurality of data types, the offset calculator 610 may calculate the plurality of offsets for the plurality of data types. Referring to lines 2 and 3 of FIG. 7, the offset calculator 610 may calculate the plurality of offsets by using Equation 1.

$$\text{Offset} = n \times \text{Channel}_{lower} \times \text{Height}_{lower} \times \text{Width}_{lower} + c \times \text{Height}_{lower} \times \text{Width}_{lower} + h \times \text{Width}_{lower} + w \quad \text{[Equation 1]}$$

where '$\text{Channel}_{lower}$, $\text{Height}_{lower}$, and $\text{Width}_{lower}$' and may refer to a channel, a height, and a width of a weight data tile allocated to the first-level memory, and (n, c, h, w) may refer to variables that are determined based on respective hardware mapping values of a plurality of data types of neural network data allocated to the first-level memory and the second-level memory.

For example, as shown in FIG. 5, it is assumed that the weight data tile is allocated as (1×1×2×2) to the first-level memory, and a weight data tile is allocated as (1×1×1×2) to the second-level memory. In this case, '$K_{lower}$, $C_{lower}$, $R_{lower}$, and $S_{lower}$', which are hardware mapping values of weight data for a GLB, may be '1, 1, 2, 2', and '$K_{upper}$, $C_{upper}$, $R_{upper}$, and $S_{upper}$' which are hardware mapping values of weight data for an LB, may be '1, 1, 1, 2'. In addition, '$\text{Channel}_{lower}$, $\text{Height}_{lower}$, and $\text{Width}_{lower}$' in the offset calculation equation may be '1, 2, 2', which are the channel, the height, and the width of the weight data tile allocated to the first-level memory. Referring to lines 9, 10, 13, and 14 of FIG. 7, the offset calculator 610 may substitute (0, 0, 0, 0) and (0, 0, 1, 0) into the variables (k, c, r, s) of the offset calculation equation through a for loop statement, based on the hardware mapping value of the first-level memory and the hardware mapping value of the second-level memory. In this case, a plurality of offsets '0, 2' for weight data may be calculated, and the calculated plurality of offsets for the weight data may indicate start components of a weight data tile updated between the GLB 510 and the first and second LBs 520 and 530 in response to an update request from among a plurality of components of weight data stored in the GLB 510 of FIG. 5.

According to an embodiment, the offset calculator 610 may calculate the required number of updates of a plurality of data types of neural network data. Referring to pseudo code lines 12 and 16 of FIG. 7, the offset calculator 610 may increase an iteration value representing the required number of updates of the plurality of data types by the number of times the respective offsets for the plurality of data types are calculated. The required number of updates of a data type corresponding to a dataflow may refer to the number of updates required to perform all workloads on the neural network data allocated to the first-level memory, and the required number of data types other than the data type corresponding to the dataflow may refer to the number of updates of each of the other data types required to perform a workload for one update of neural network data of the data type corresponding to the dataflow. For example, according to the embodiment of FIG. 5, the offset calculator 610 may calculate the number of necessary updates of the weight data as 2, because the plurality of offsets of the weight data corresponding to the dataflow are calculated twice in total, and may calculate the number of necessary updates of input data and the number of necessary updates of output data as 4, respectively, because offsets of the input data and the output data are calculated a total of 4 times for one weight data update.

According to an embodiment, each of the plurality of offsets of the data type corresponding to the dataflow may be grouped with at least one offset of each of the other data types calculated together with the each offset. For example, according to the embodiment of FIG. 5, the offset '0, 2, 10, 12' of the input data and the offset '0, 2, 8, 10' of the output data are calculated while the offset '0' of the weight data is being calculated, and the offset '5, 7, 15, 17' of the input data and the offset '0, 2, 8, 10' of the output data are calculated while the offset '2' of the weight data is being calculated. In this case, the offset '0' of the weight data, the offset '0, 2, 10, 12' of the input data, and the offset '0, 2, 8, 10' of the output data may be grouped into a first group, and the offset '2' of the weight data, the offset '5, 7, 15, 17' of the input data, and the offset '0, 2, 8, 10' of the output data may be grouped into a second group.

According to an embodiment, when parallel neural network data is updated, a plurality of update data tiles corresponding to a plurality of offsets belonging to the same group may be updated for the same upper-level memory. For example, as shown in FIG. 5, an update data tile corresponding to a plurality of offsets belonging to a first group may be updated with respect to the first LB 520, and an update data tile corresponding to a plurality of offsets belonging to a second group may be updated with respect to the second LB 530.

FIG. 8 is pseudo code describing an operation of an ordering manager according to an embodiment. The pseudo code of FIG. 8 is an example of an algorithm in which the ordering manager 620 of FIG. 6 determines the movement order of neural network data, when it is assumed that a dataflow is a WS dataflow. When the dataflow is an IS dataflow or an OS dataflow, a for loop statement based on a hardware mapping value related to the dataflow may be located outside, and locations of conditional statements and variables related to each dataflow may be changed. $\text{iter}_I$, $\text{iter}_W$, and $\text{iter}_O$ indicating the required numbers of updates included in FIG. 8 may correspond to $\text{iteration}_I$, $\text{iteration}_W$, and iteration$_O$ indicating the required numbers of movements of the plurality of data types calculated in FIG. 8.

According to an embodiment, the ordering manager 620 may calculate the cumulative number of updates of neural network data. When the neural network data is updated in response to an update request, the ordering manager 620 may increase the cumulative number of updates of the data type of the updated neural network data. For example, referring to pseudo code lines 8, 11, and 14 of FIG. 8, the ordering manager 620 may increase a cnt value representing the cumulative number of updates the plurality of data types whenever neural network data is updated. The cumulative number of updates of the data types other than the data type corresponding to the dataflow may be initialized whenever the cumulative number of updates of the data type corresponding to the dataflow increases.

According to an embodiment, the ordering manager 620 may identify the data type of an update data tile, based on the required number of updates of the plurality of data types and the cumulative number of updates at a time point when the update request is received. The ordering manager 620 may identify the data type of the update data tile as one of the data type corresponding to the dataflow, the data types other than the data type corresponding to the dataflow, and all of the plurality of data types, by comparing the required number of updates of the plurality of data types with the cumulative number of updates at the time point when the update request is received.

For example, it is assumed that the required numbers of updates of input data, weight data, and output data calculated according to the above-described embodiments of FIGS. 5 and 7 are '4, 2, 4'.

When the cumulative numbers of updates of the input data, the weight data, and the output data at the time point when the update request is received are '0, 0, 0', a workload based on new neural network data needs to be performed in the second-level memory that has transmitted the update request at the time point when the update request is received. Accordingly, as shown in lines 7 and 8 of FIG. 8, the ordering manager 620 may identify the data types of the update data tile as input data, weight data, and output data, and may increase, by 1, the cumulative numbers of updates of the input data, the weight data, and the output data that are to be updated.

When the cumulative numbers of updates of the input data, the weight data, and the output data at the time point when the update request is received are '2, 1, 2', weight data updated in the second-level memory at the time point when the update request is received is re-used, and thus update of the weight data may not be needed. Accordingly, as shown in lines 10 and 11 of FIG. 8, the ordering manager 620 may identify the data types of the update data tile as the input data and the output data, and may increase, by 1, the cumulative numbers of updates of the input data and the output data that are to be updated.

When the cumulative numbers of updates of the input data, the weight data, and the output data at the time point when the update request is received are '4, 1, 4', workloads for weight data updated in the second-level memory at the time point when the update request is received have all been performed, and thus new weight data needs to be updated. Accordingly, as shown in lines 13 and 14 of FIG. 8, the ordering manager 620 may identify the data type of the update data tile as weight data, increase the cumulative number of updates of the weight data by 1, and initialize the cumulative numbers of updates of the input data and the output data to 0. Accordingly, input data and output data related to newly updated weight data in response to a next update request may be updated.

According to an embodiment, the ordering manager 620 may transmit an update request for neural network data to a memory controller that controls a memory at a lower-level than the first-level memory, based on the required number of updates of the plurality of data types and the cumulative number of updates at a time point when the update request is received. The ordering manager 620 may compare the required number of updates of the plurality of data types with the cumulative number of updates at the time point when the update request is received, and may transmit an update request for new neural network data when the cumulative number of updates of the plurality of data types at the time when the update request for neural network data is received is equal to the required number of updates. For example, in the above-described embodiment, when the cumulative numbers of updates of the input data, the weight data, and the output data are '4, 2, 4', updates of neural network data allocated to the first-level memory have all been performed at the time point when the update request is received, and thus the first-level memory needs to be updated with new neural network data. Accordingly, the ordering manager 620 may initialize the required number of updates of the plurality of data types to 0, as shown in lines 16, 17, and 18 of FIG. 8, transmit an update request for neural network data to a memory at a lower-level than the first-level memory, and wait until update of the neural network data corresponding to the update request is performed.

FIG. 9 is pseudo code describing an operation of an address calculator according to an embodiment. The pseudo code of FIG. 9 is an example of an algorithm in which the address calculator 630 of FIG. 6 identifies memory addresses of one or more components of an update data tile. 'Input data transfer', 'Output data transfer', and 'Weight data transfer' of FIG. 9 may refer to when data transfer (Input), data transfer (Output), and data transfer (Weight) of FIG. 8 have been performed.

According to an embodiment, the address calculator 630 may calculate a distance to an offset, based on the hardware mapping value of the update data tile. The address calculator 630 may calculate the distance to the offset by substituting variables determined based on the hardware mapping values of neural network data allocated to the second-level memory into the variables (n, c, h, and w) of Equation 1 of FIG. 7. Referring to lines 2 and 3 of FIG. 9, the address calculator 630 may identify calculate the one or more components of the update data tile by using Equation 2.

$$\text{Distance} = \text{Offset} + n \times \text{Channel}_{lower} \times \text{Height}_{lower} \times \text{Width}_{lower} + c \times \text{Height}_{lower} \times \text{Width}_{lower} + h \times \text{Width}_{lower} + w \qquad \text{[Equation 2]}$$

where the distance to the offset corresponds to '$n \times \text{Channel}_{lower} \times \text{Height}_{lower} \times \text{Width}_{lower} + c \times \text{Height}_{lower} \times \text{Width}_{lower} + h \times \text{Width}_{lower} + w$' in Equation 2. According to an embodiment, the address calculator 630 may identify a component spaced apart from the offset by the distance to the offset as the one or more components of the update data tile. The address calculator 630 may identify a memory address of the first-level memory to which the identified one or more components have been allocated, and may update neural network data stored at the identified memory address between the first-level memory and the second-level memory.

For example, it is assumed that neural network data has been allocated to the first-level memory and the second-level memory as in the above-described embodiment of FIG. 5. In this case, hardware mapping values '$B_{upper}$, $C_{upper}$, $H_{upper}$, and $W_{upper}$' of input data for the second-level memory may be '1, 1, 2, 3'. Referring to lines 16, 17, and 18 of FIG. 9, when the address calculator 630 receives, from the ordering manager 620, information indicating that the data type of the update data tile is an input data type and the offset of the update data tile is '0', the address calculator 630 may substitute (0, 0, 0, 0), (0, 0, 0, 1), (0, 0, 0, 2), (0, 0, 1, 0), (0, 0, 1, 1) and (0, 0, 1, 2) into variables (b, c, h, w) of a distance calculation equation, based on the hardware mapping value of the input data allocated to the second-level memory. In this case, '0, 1, 2, 5, 6, 7' may be obtained by adding the distance to the offset '0, 1, 2, 5, 6, 7' to the offset '0', and the address calculator 630 may identify components corresponding to an index value '0, 1, 2, 5, 6, 7' of an input data tile spaced apart from an offset '0' of the input data tile by the distance to the offset '0, 1, 2, 5, 6, 7', as the one or more components of the update data tile. When the address calculator 630 receives, from the ordering manager 620, information indicating that the data type of the update data tile is an input data type and the offset of the update data tile is '2', the address calculator 630 may identify components corresponding to 5, 6, 7, 10, 11, and 12 of an input data tile as the one or more components of the update data tile according to the aforementioned method. The address calculator 630 may identify a memory address of the first-level memory to which the components corresponding to the index values 0, 1, 2, 5, 6, and 7 of the input data tile have been allocated and a memory address of the first-level memory to which the components corresponding to the index values 5, 6, 7, 10, 11, and 12 of the input data tile have been allocated, and may update neural network data stored at the identified memory addresses between the first-level memory and the second-level memory.

FIG. 10 is a table for comparing specifications of a DNN accelerator according to an embodiment with other DNN accelerators;

FIG. 10 illustrates, as an example, specifications of a DNN accelerator 'Fornax' according to an embodiment and specifications of other DNN accelerators 'Eyeriss', 'Flex-Flow', and 'MAERI' in each of which an interconnection network exists.

According to an embodiment, 'Fornax' may be provided with a GLB and an LB having sizes capable of maximizing energy efficiency and performance. For example, the GLB may be a unified buffer having a size of 128 KB, and the LB may include individual buffers each having a size of 32 bytes for a plurality of data types of neural network data. However, this is an example selected empirically in consideration of energy efficiency and performance of a neural network accelerator, and other sizes may be selected based on at least one of hardware design costs, energy efficiency, and performance of the DNN accelerator 200.

According to an embodiment, 'Fornax' may not have an interconnection network. On the other hand, 'Eyeriss', 'FlexFlow' and 'MAERI', which are other DNN accelerators, may have interconnection networks. In other words, because 'Fornax' does not have an interconnection network, 'Fornax' has low hardware complexity compared to 'Eyeriss', 'FlexFlow' and 'MAERI'. Accordingly, 'Fornax' may achieve optimal energy efficiency and optimal performance, and may also increase design efficiency and reduce design costs.

According to an embodiment, in 'Fornax', GLBs, LBs, and other level memories not included in FIG. 10 may support various dataflows. In other words, because 'Fornax' supports various dataflows, 'Fornax' may perform calculations by selecting and applying a dataflow capable of ensuring optimal energy efficiency and/or optimal performance. On the other hand, in 'Eyeriss', 'FlexFlow', and 'MAERI', a specific level memory may support only a single dataflow, or may support only dataflows for two data types among the plurality of data types even when they support multiple dataflows.

Figure 11A:
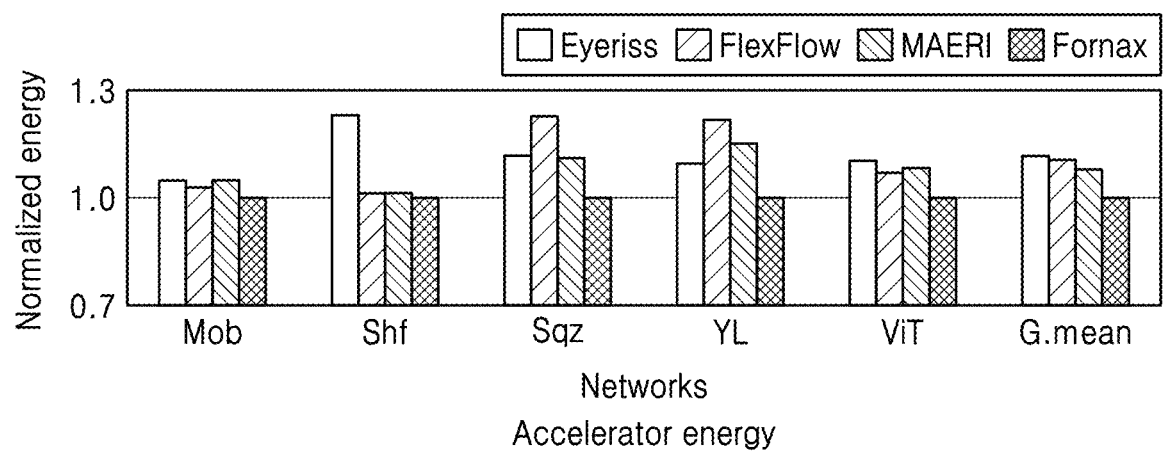
FIGS. 11A and 11B are graphs showing a comparison between respective performances of a DNN accelerator according to an embodiment and other DNN accelerators.
Figure 11B:
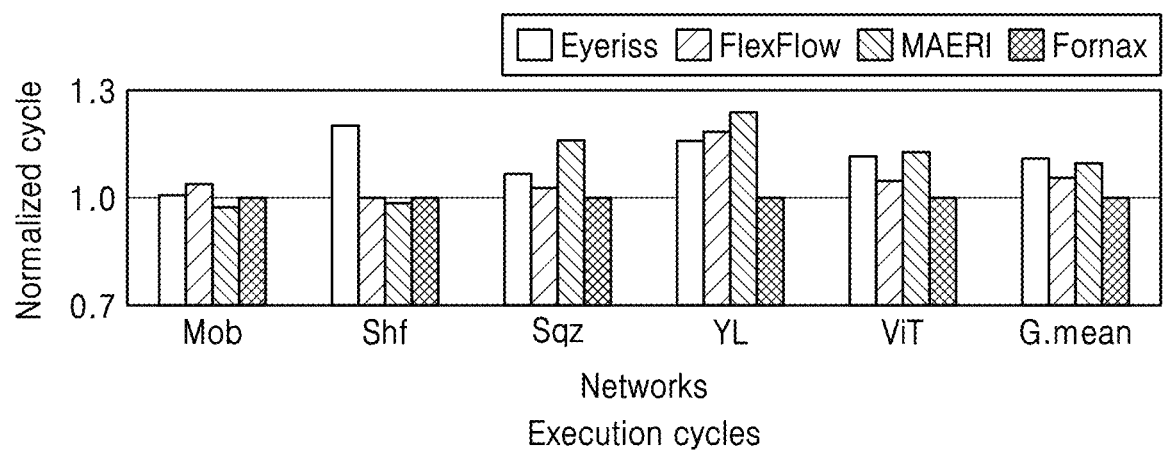

FIGS. 11A and 11B are graphs showing a comparison between respective performances of a DNN accelerator according to an embodiment and other DNN accelerators. FIGS. 11A and 11B show measurements based on experimental results that identify an optimal execution method of all DNN layers for minimizing energy or a period by using a timeloop analysis method. A DNN accelerator 'Fornax' according to an embodiment was designed and synthesized through a synopsis design compiler using SAED 32 nm technology to evaluate hardware complexity. 'Fornax' was implemented to operate at a clock frequency of 200 MHz and an operating voltage of 0.95V.

Referring to FIG. 11A, the DNN accelerator 'Fornax' according to an embodiment is compared with the other DNN accelerators 'Eyeriss', 'FlexFlow', and 'MAERI' in terms of energy required for operations of various DNN layers.

According to an embodiment, when a dataflow and hardware mapping capable of obtaining optimal energy efficiency are applied to each of a plurality of DNN accelerators, 'Fornax' may reduce energy consumption by 11.9%, 10.8%, and 8.2% on average compared to 'Eyeriss', 'FlexFlow', and 'MAERI', respectively. FIG. 11A may show that, for all DNN layers, 'Fornax' provides excellent energy efficiency compared to the other DNN accelerators. Because 'Eyeriss', 'FlexFlow' and 'MAERI' do not support the flexibility of a complete dataflow for all level memories despite existence of interconnection networks between different PEs (hereinafter, referred to as interconnection networks), 'Eyeriss', 'FlexFlow' and 'MAERI' may provide reduced energy efficiency for various DNN layers' operations compared to 'Fornax' supporting the flexibility of a complete dataflow.

Referring to FIG. 11B, the DNN accelerator 'Fornax' according to an embodiment is compared with the other DNN accelerators 'Eyeriss', 'FlexFlow', and 'MAERI' in terms of a data processing cycle required for operations of various DNN layers.

According to an embodiment, when a dataflow and hardware mapping capable of obtaining optimal energy efficiency are applied to each of a plurality of DNN accelerators, 'Fornax' may achieve high data processing performance by 1.11 times, 1.06 times, and 1.09 times on average compared to 'Eyeriss', 'FlexFlow', and 'MAERI', respectively. 'MAERI' achieves higher data processing performance than 'Fornax' for some DNN layers. However, this is because 'MAERI' was able to apply a dataflow and hardware mapping capable of securing the optimal performance of corresponding DNN layers through the interconnection network. On the other hand, the present application may achieve data processing performance similar to that of 'MAERI' even for corresponding DNN layers by supporting the flexibility of a complete dataflow even when there is no interconnection networks.

Figure 12A:
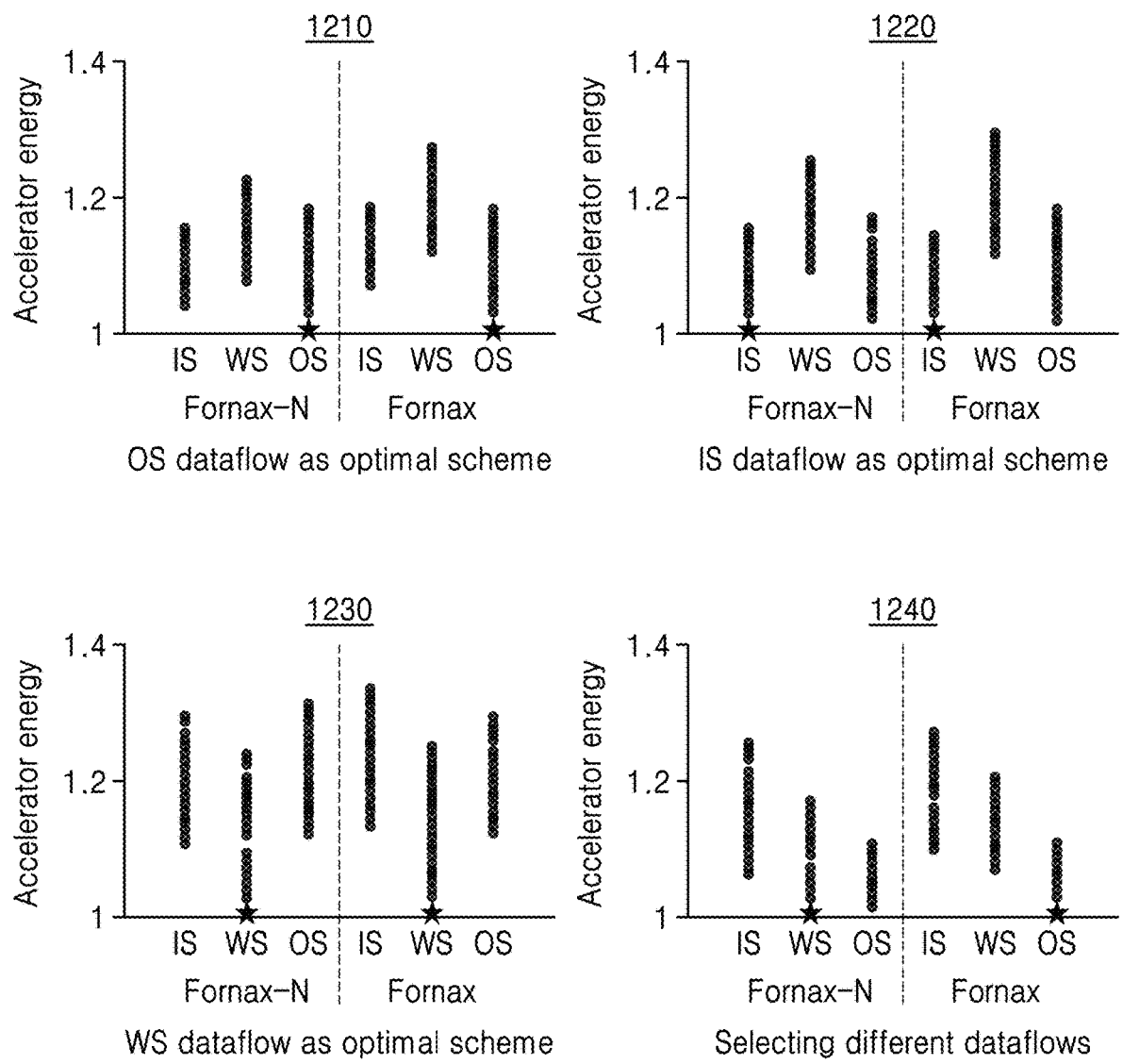
FIGS. 12A and 12B are graphs showing a comparison in performance and a design area according to presence or absence of an interconnection network of a DNN accelerator according to an embodiment.
Figure 12B:
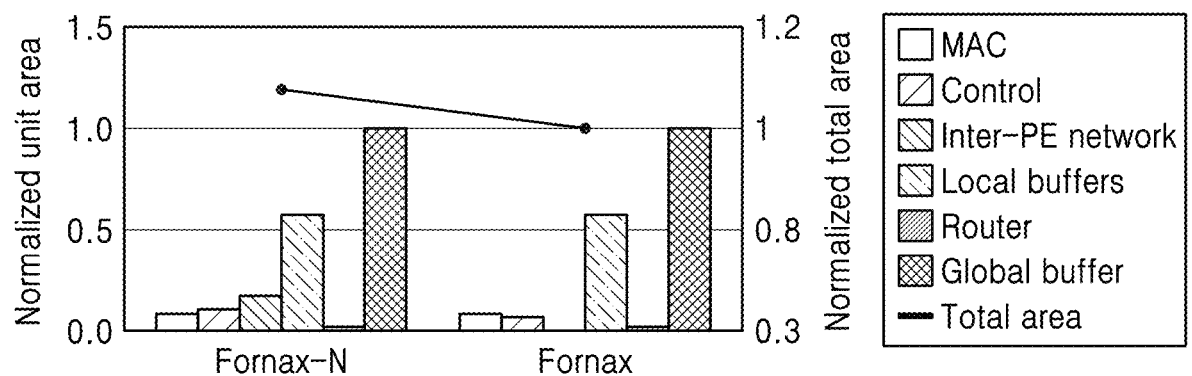

FIGS. 12A and 12B are graphs showing a comparison in performance and a design area according to presence or absence of an interconnection network of a DNN accelerator according to an embodiment.

In FIG. 12A, the energy required for an operation of a DNN accelerator 'Fornax' including no interconnection networks according to an embodiment is compared with the energy required for an operation of a DNN accelerator 'Fornax-N' including an interconnection network. FIG. 12A shows a minimum energy scheduling solution for executing a YOLO layer based on a brute-force Timeloop analysis method, a gray line in the graph is a clustered data point, and each data point indicates the energy required for a calculation of a DNN accelerator of a possible execution method. An OS dataflow graph 1210, an IS dataflow graph 1220, and a WS dataflow graph 1230 represent the energy required for a calculation of a DNN accelerator of each execution method when 'Fornax' and 'Fornax-N' select the same dataflow in a local buffer. A different dataflow selection graph 1240 represents the energy required for a calculation of a DNN accelerator of each execution method when 'Fornax' and 'Fornax-N' select different dataflows to achieve optimal energy efficiency.

Referring to FIG. 12A, it may be confirmed through the OS dataflow graph 1210 that 'Fornax' and 'Fornax-N' utilize an OS dataflow to achieve energy optimization, and, in this case, each DNN accelerator generates exactly the same energy cost difference. It may also be confirmed through the IS dataflow graph 1220 and the WS dataflow graph 1230 that 'Fornax' generates energy cost differences of 0% (none) and 1.8% compared to 'Fornax-N'. It may also be confirmed through the different dataflow selection graph 1240 that 'Fornax' and 'Fornax-N' select different dataflows for minimum energy execution, but, when execution methods in which actually lowest energy costs of the two DNN accelerators are generated are compared with each other, 'Fornax' generates an energy cost difference of 1.2% compared to 'Fornax-N'.

Referring to FIG. 12B, respective design areas of a DNN accelerator 'Fornax' including no interconnection networks and a DNN accelerator 'Fornax-N' including an interconnection network, and respective design areas of the detailed components included in the two DNN accelerators are illustrated through the graph.

Referring to FIG. 12B, 'Fornax-N' needs more design areas based on an inter-PE network configuration and additional components for implementing an inter-PE network than 'Fornax'. Accordingly, it may be confirmed that the total design area of 'Fornax-N' increases by 8.3% compared to 'Fornax'.

As such, the inter-PE network may increase the complexity and costs of hardware design. However, a DNN accelerator according to an embodiment supports flexible hardware mapping and a flexible dataflow, and thus achieve optimal energy efficiency and optimal performance without inter-PE networks.

Figure 13:
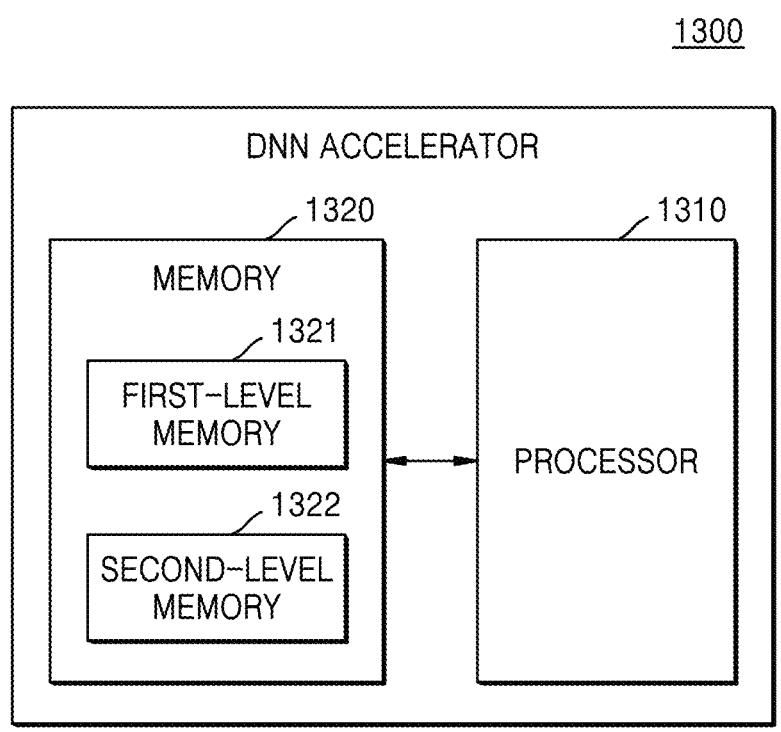
FIG. 13 is a block diagram of a detailed configuration of a DNN accelerator according to an embodiment.

FIG. 13 is a block diagram of a detailed configuration of a DNN accelerator according to an embodiment. Referring to FIG. 13, a DNN accelerator 1300 according to an embodiment may include at least one processor 1310 and a memory 1320. However, the components of the DNN accelerator 1300 are not limited to those shown in FIG. 13, and the DNN accelerator 1300 may be implemented with more components than those shown in FIG. 13.

The at least one processor 1310 controls all operations of the DNN accelerator 1300. According to an embodiment, the at least one processor 1310 may include a memory controller that controls an operation of the memory 1300, and the memory controller may correspond to the memory controller described above with reference to FIGS. 1 through 12. According to an embodiment, the at least one processor 1310 may include a host that transmits a data processing command to the memory controller, and the host may correspond to the host described above with reference to FIGS. 1 through 12.

The memory 1320 may include a first-level memory 1321 and a second-level memory 1322. However, the components of the memory 1320 are not limited to those shown in FIG. 13, and the memory 1320 may be implemented with more components than those shown in FIG. 13. For example, the memory 1320 may include a memory at an upper-level than the first-level memory 1321 or a memory at a lower-level than the second-level memory 1322, or may include a memory controller that controls an operation of each level memory. According to an embodiment, the memory 1320 may store a program or instruction for processing and control by the at least one processor 1310. According to an embodiment, the memory 1320 may store neural network data required for a deep neural network calculation of the DNN accelerator 1300.

According to an embodiment, based on a dataflow and a hardware mapping value of neural network data allocated to a first-level memory, at least one processor may calculate a plurality of offsets representing start components of a plurality of data tiles of the neural network data. According to an embodiment, in response to an update request for the neural network data, the at least one processor may identify the data type of an update data tile corresponding to the received update request among the plurality of data tiles. According to an embodiment, the at least one processor may identify the memory address of the first-level memory to which neural network data of the update data tile is allocated based on a data type of the update data tile and an offset of the update data tile among the plurality of offsets. According to an embodiment, the at least one processor may update neural network data stored in the identified memory address between the first-level memory and a second-level memory. According to an embodiment, the dataflow may include information about a data type of neural network data reused by the second-level memory among the plurality of data types of the neural network data. According to an embodiment, the hardware mapping value may include information about the shapes of data tiles of neural network data allocated to the first-level memory and the second-level memory.

According to an embodiment, based on a hardware mapping value of each of a plurality of data types, the at least one processor may calculate the plurality of offsets for the plurality of data types.

According to an embodiment, the at least one processor may calculate the required number of updates and the cumulative number of updates of the plurality of data types, and may identify the data type of the update data tile, based on the required number of updates and the cumulative number of updates at a time point when the update request is received.

According to an embodiment, the at least one processor may calculate a distance to an offset based on a hardware mapping value of the identified data type, and may identify a component spaced apart from the offset by the distance to the offset as at least one component of the update data tile.

According to an embodiment, at least one of the dataflow and the hardware mapping value may be determined based on at least one of energy and a data processing cycle that are necessary for an operation of the DNN accelerator.

According to an embodiment, the second-level memory may be a memory at an upper-level than the first-level memory in the memory hierarchy of the DNN accelerator.

According to an embodiment, the first-level memory may include a GLB composed of a unified buffer that shares regions to which neural network data of the plurality of data types are allocated.

According to an embodiment, the second-level memory may include individual buffers for a plurality of data types having the same size.

According to an embodiment, in the DNN accelerator, an interconnection network for transmitting and receiving neural network data may not exist between components respectively including different second-level memories.

As such, because the DNN accelerator 1300 according to an embodiment may perform neural network calculations according to hardware mapping and a dataflow that satisfy at least one of optimal energy efficiency and optimal performance while eliminating interconnection networks, energy efficiency and performance may be secured and also design efficiency may be increased, and design costs may be lowered. Because an interconnection network is removed and thus the hardware size is reduced, the application field of the DNN accelerator 1300 may be further expanded.

According to an embodiment, energy efficiency and performance may be maximized by provisioning a controller that performs a workload with a flexible dataflow of an accelerator.

According to an embodiment, the necessity of a heavy NoC may be effectively removed by provisioning a controller that performs a workload with a flexible dataflow of an accelerator.

According to an embodiment, hardware design costs may be reduced and the complexity may be lowered, by provisioning a controller that performs a workload with a flexible dataflow of an accelerator.

The preceding description of the disclosure is provided to enable any person skilled in the art to execute or use the disclosure. Various modifications of the disclosure will be readily apparent to those skilled in the art, and the general principles defined herein are applicable to various modifications without departing from the spirit or scope of the disclosure. Thus, the disclosure is not intended to be limited to the examples set forth herein but is to provide a widest scope consistent with the principles and novel features disclosed herein.

Although exemplary implementations may mention utilization of aspects of the presently disclosed subject matter in the context of one or more stand-alone computer systems, the subject matter is not limited thereto, but rather may be implemented in conjunction with any computing environment, such as a network or a distributed computing environment. Furthermore, the aspects of the presently-disclosed subject matter may be implemented in or across a plurality of processing chips or devices, and storage may be similarly affected across the plurality of devices. These devices may include PCs, network servers, and handheld devices.

Embodiments of the disclosure can also be embodied as a storage medium including instructions executable by a computer such as a program module executed by the computer. A computer readable medium can be any available medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. Communication media may typically include computer readable instructions, data structures, or other data in a modulated data signal, such as program modules.

In addition, computer-readable storage media may be provided in the form of non-transitory storage media. The 'non-transitory storage medium' is a tangible device and only means that it does not contain a signal (e.g., electromagnetic waves). This term does not distinguish a case in which data is stored semi-permanently in a storage medium from a case in which data is temporarily stored. For example, the non-transitory recording medium may include a buffer in which data is temporarily stored.

According to an embodiment of the disclosure, a method according to various disclosed embodiments may be provided by being included in a computer program product. The computer program product, which is a commodity, may be traded between sellers and buyers. Computer program products are distributed in the form of device-readable storage media (e.g., compact disc read only memory (CD-ROM)), or may be distributed (e.g., downloaded or uploaded) through an application store or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

While one or more embodiments have been described with reference to the figures, it will be understood by those of ordinary skill in the art that various changes in form and details may be made therein without departing from the spirit and scope of the disclosure as defined by the following claims.

What is claimed is:

1. A control method of a deep neural network (DNN) accelerator for optimized data processing, the control method comprising:
   based on a dataflow and a hardware mapping value of neural network data allocated to a first-level memory, calculating a plurality of offsets representing start components of a plurality of data tiles of the neural network data;
   based on receiving an update request for the neural network data from a second-level memory, identifying a data type of an update data tile corresponding to the received update request among the plurality of data tiles;
   identifying one or more components of the update data tile, based on the data type of the update data tile and an offset of the update data tile among the calculated plurality of offsets; and
   updating neural network data of the identified one or more components between the first-level memory and the second-level memory,
   wherein the dataflow comprises information about a data type of the neural network data reused by the second-level memory among the plurality of data types of the neural network data, and
   wherein the hardware mapping value comprises information about shapes of data tiles of the neural network data allocated to the first-level memory and the second-level memory.

2. The control method of claim 1, wherein the calculating of the plurality of offsets comprises, based on a hardware mapping value of each of the plurality of data types, calculating the plurality of offsets for the plurality of data types.

3. The control method of claim 1, further comprising calculating the required number of updates and the cumulative number of updates of the plurality of data types,
wherein the calculating of the data type of the update data tile comprises identifying the data type of the update data tile, based on the required number of updates and the cumulative number of updates at a time point when the update request is received.

4. The control method of claim 1, wherein the identifying of the memory address comprises:
calculating a distance to an offset, based on a hardware mapping value of the identified data type; and
identifying a component separated apart from the offset by the distance to the offset as at least one component of the updated data tile.

5. The control method of claim 1, wherein at least one of the dataflow and the hardware mapping value is determined based on at least one of energy and a data processing cycle that are necessary for an operation of the DNN accelerator.

6. The control method of claim 1, wherein the second-level memory is a memory at an upper-level than the first-level memory in a memory hierarchy of the DNN accelerator.

7. The control method of claim 6, wherein the first-level memory comprises a unified buffer that shares regions to which neural network data of the plurality of data types are allocated.

8. The control method of claim 6, wherein the second-level memory comprises individual buffers having same sizes to which the plurality of data types of the neural network data are allocated, respectively.

9. The control method of claim 1, wherein, in the DNN accelerator, an interconnection network for transmitting and receiving neural network data does not exist between components respectively including different second-level memories.

10. A deep neural network (DNN) accelerator for optimized data processing, the DNN accelerator comprising:
a first-level memory;
a second-level memory; and
at least one processor configured to control an operation of the first-level memory and an operation of the second-level memory,
wherein the at least one processor is further configured to:
based on a dataflow and a hardware mapping value of the neural network data allocated to the first-level memory, calculate a plurality of offsets representing start components of a plurality of data tiles of the neural network data;
based on receiving an update request for the neural network data from the second-level memory, identify a data type of an update data tile corresponding to the received update request among the plurality of data tiles;
identify a memory address of the first-level memory to which neural network data of the update data tile has been allocated, based on a data type of the update data tile and an offset of the update data tile among the plurality of offsets; and
update neural network data of the identified memory address between the first-level memory and the second-level memory,
wherein the dataflow comprises information about a data type of the neural network data reused by the second-level memory among a plurality of data types of the neural network data, and wherein the hardware mapping value comprises information about shapes of data tiles of the neural network data allocated to the first-level memory and the second-level memory.

11. The DNN accelerator of claim 10, wherein the at least one processor is further configured to, based on a hardware mapping value of each of the plurality of data types, calculating a plurality of offsets for the plurality of data types.

12. The DNN accelerator of claim 10, wherein the at least one processor is further configured to calculate the required number of updates and the cumulative number of updates of the plurality of data types, and identify the data type of the update data tile, based on the required number of updates and the cumulative number of updates at a time point when the update request is received.

13. The DNN accelerator of claim 10, wherein the at least one processor is further configured to calculate a distance to an offset based on a hardware mapping value of the identified data type, and identify a component spaced apart from the offset by the distance to the offset as at least one component of the update data tile.

14. The DNN accelerator of claim 10, wherein at least one of the dataflow and the hardware mapping value is determined based on at least one of energy and a data processing cycle that are necessary for an operation of the DNN accelerator.

15. The DNN accelerator of claim 10, wherein the second-level memory is a memory at an upper-level than the first-level memory in a memory hierarchy of the DNN accelerator.

16. The DNN accelerator of claim 15, wherein the first-level memory comprises a global buffer composed of a unified buffer that shares regions to which neural network data of the plurality of data types are allocated.

17. The DNN accelerator of claim 15, wherein the second-level memory comprises individual buffers having same sizes to which the plurality of data types of the neural network data are allocated, respectively.

18. The DNN accelerator of claim 10, wherein, in the DNN accelerator, an interconnection network for transmitting and receiving neural network data does not exist between components respectively including different second-level memories.

19. A non-transitory computer-readable recording medium having recorded thereon a program, which, when executed by a computer, performs a control method of a deep neural network (DNN) accelerator, the control method comprising:
based on a dataflow and a hardware mapping value of the neural network data allocated to a first-level memory, calculating a plurality of offsets representing start components of a plurality of data tiles of the neural network data;
based on receiving an update request for the neural network data from a second-level memory, identifying a data type of an update data tile corresponding to the received update request among the plurality of data tiles;
identifying one or more components of the update data tile, based on the data type of the update data tile and an offset of the update data tile among the calculated plurality of offsets; and
updating neural network data of the identified one or more components between the first-level memory and the second-level memory, wherein
the dataflow comprises information about a data type of the neural network data reused by the second-level memory among a plurality of data types of the neural network data, and
the hardware mapping value comprises information about shapes of data tiles of the neural network data allocated to the first-level memory and the second-level memory.

* * * * *